Dec. 9, 1969   G. R. COGAR ET AL   3,483,523
DATA RECORDING AND VERIFYING MACHINE
Filed March 30, 1966   17 Sheets-Sheet 1
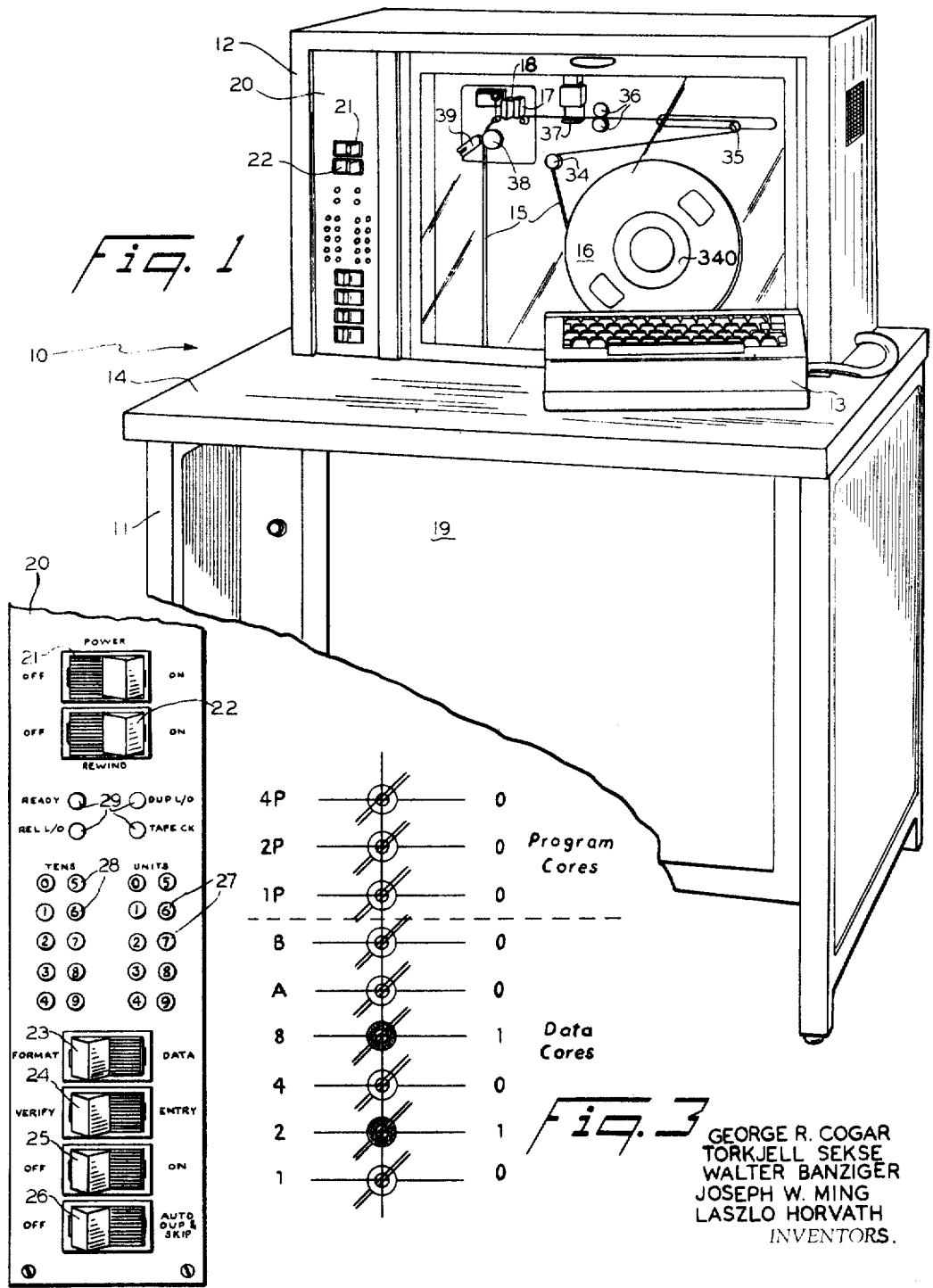
GEORGE R. COGAR
TORKJELL SEKSE
WALTER BANZIGER
JOSEPH W. MING
LASZLO HORVATH
INVENTORS.
BY Bruns & Jenney
Attorneys

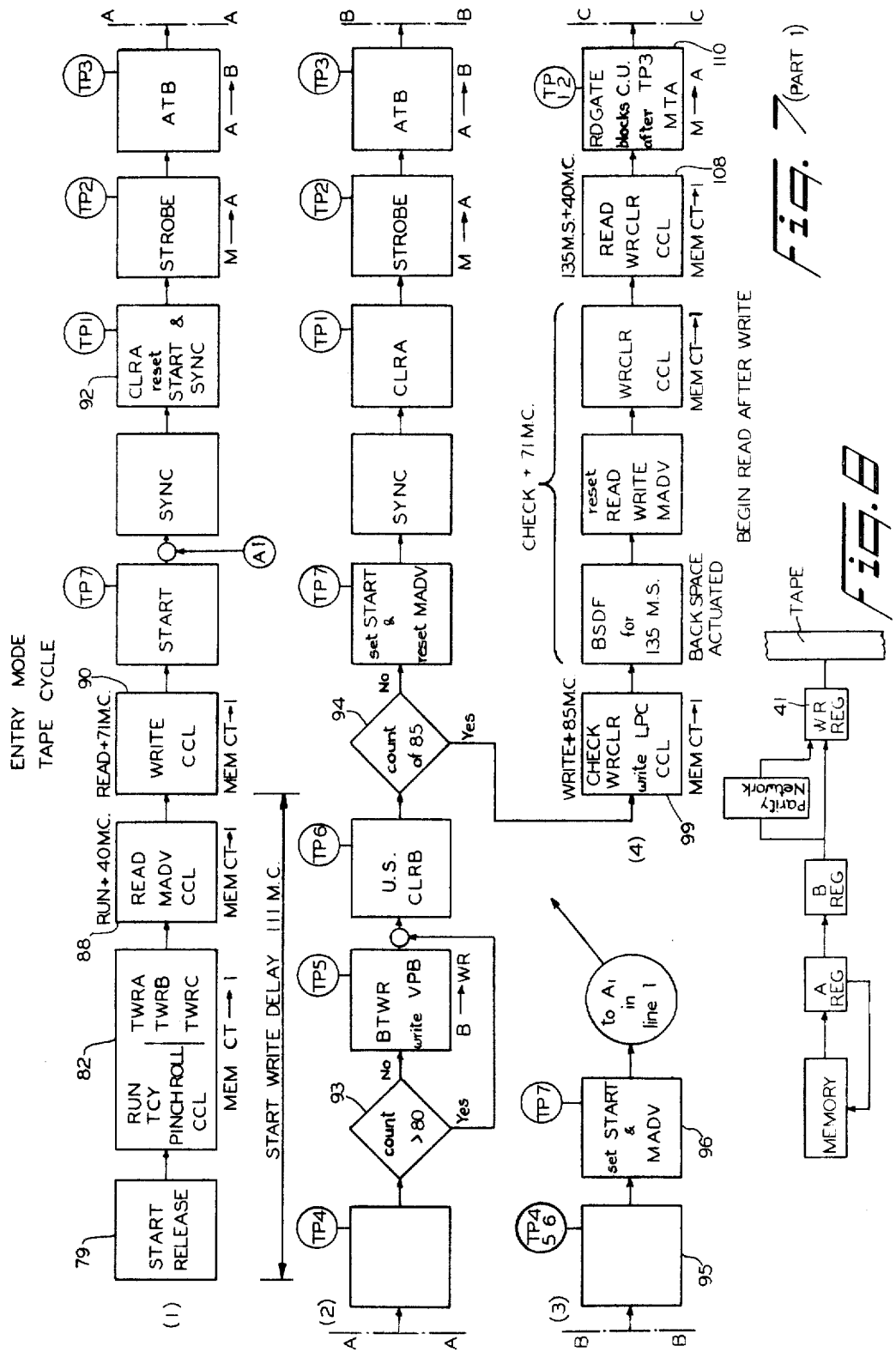

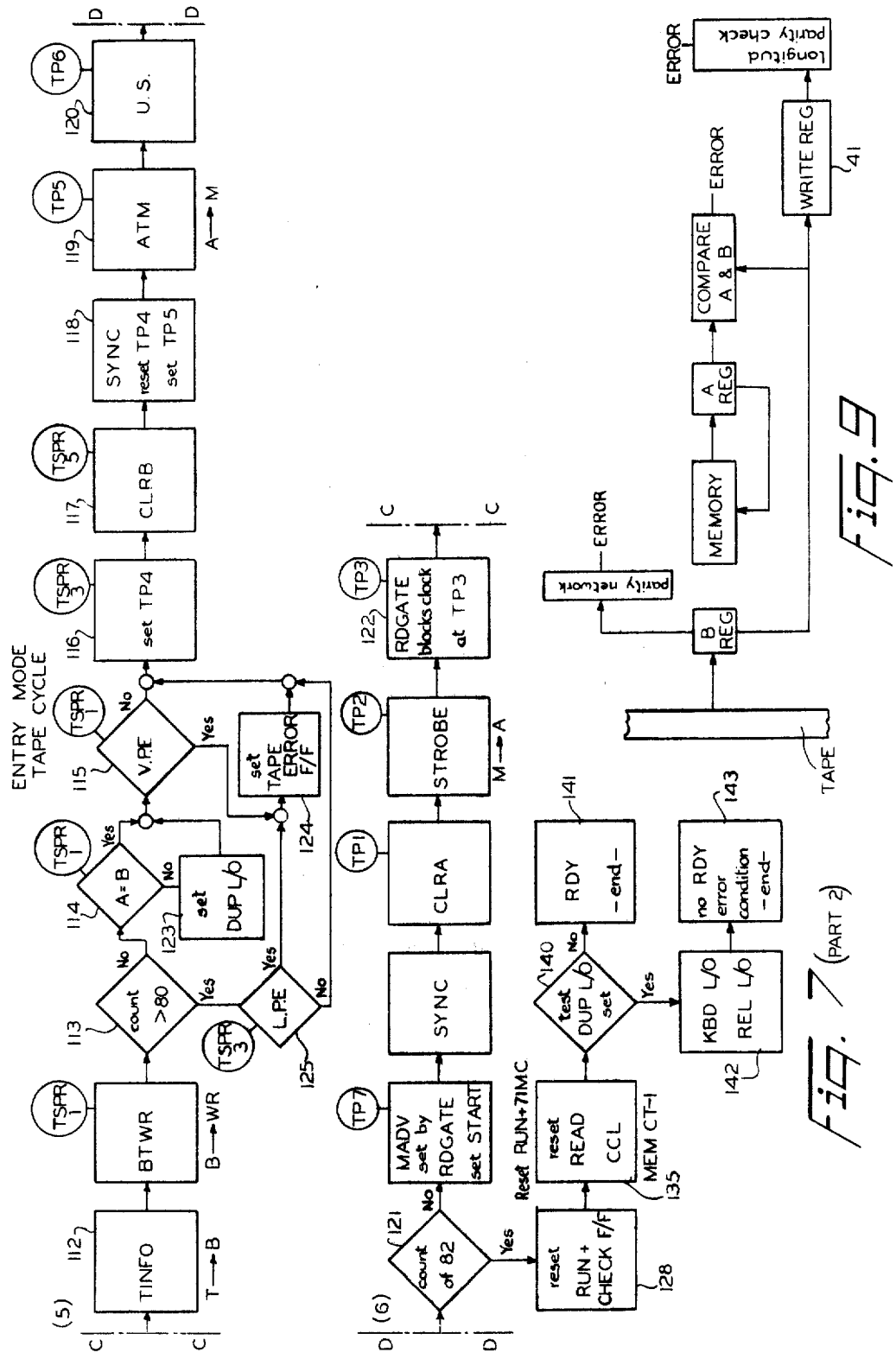

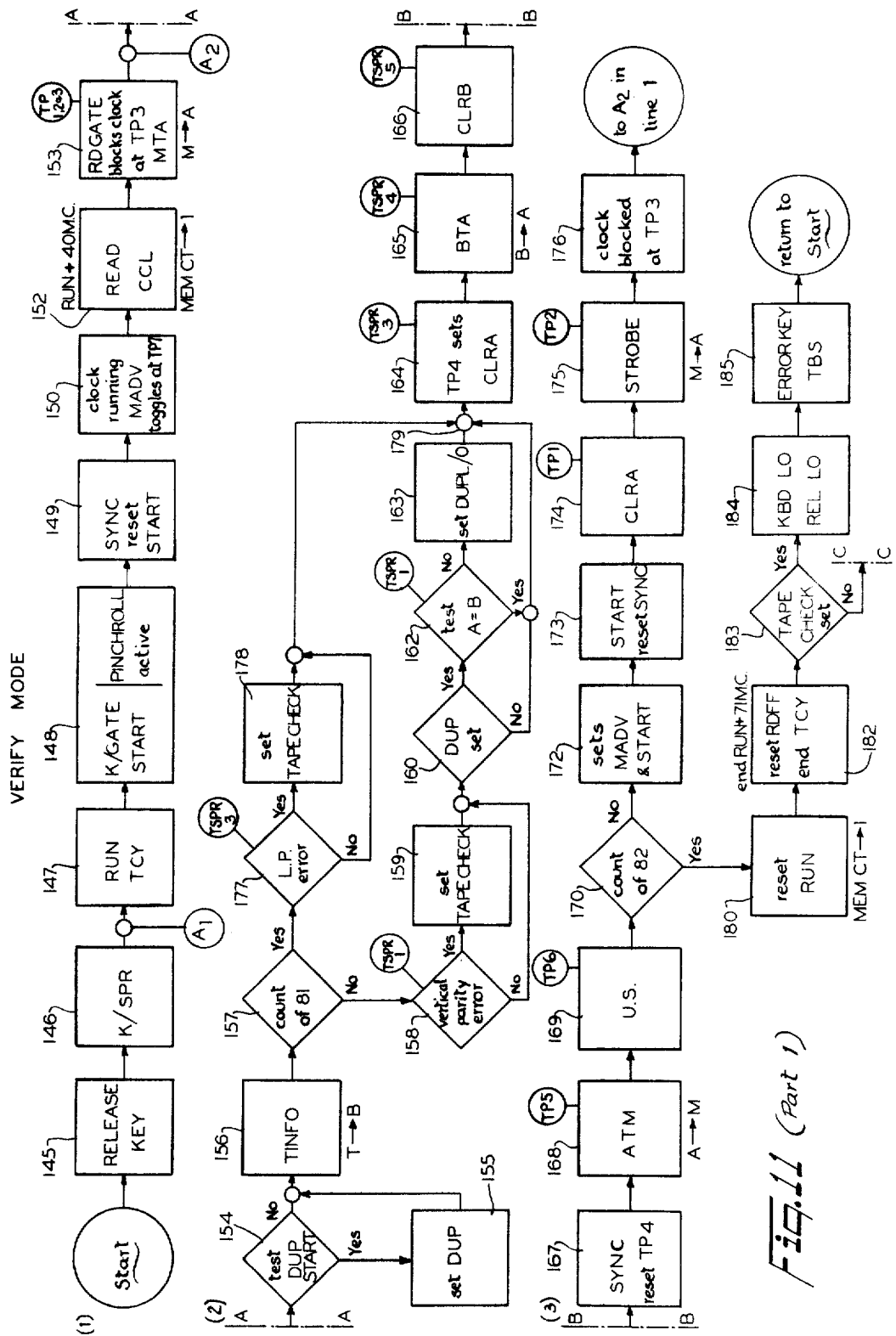

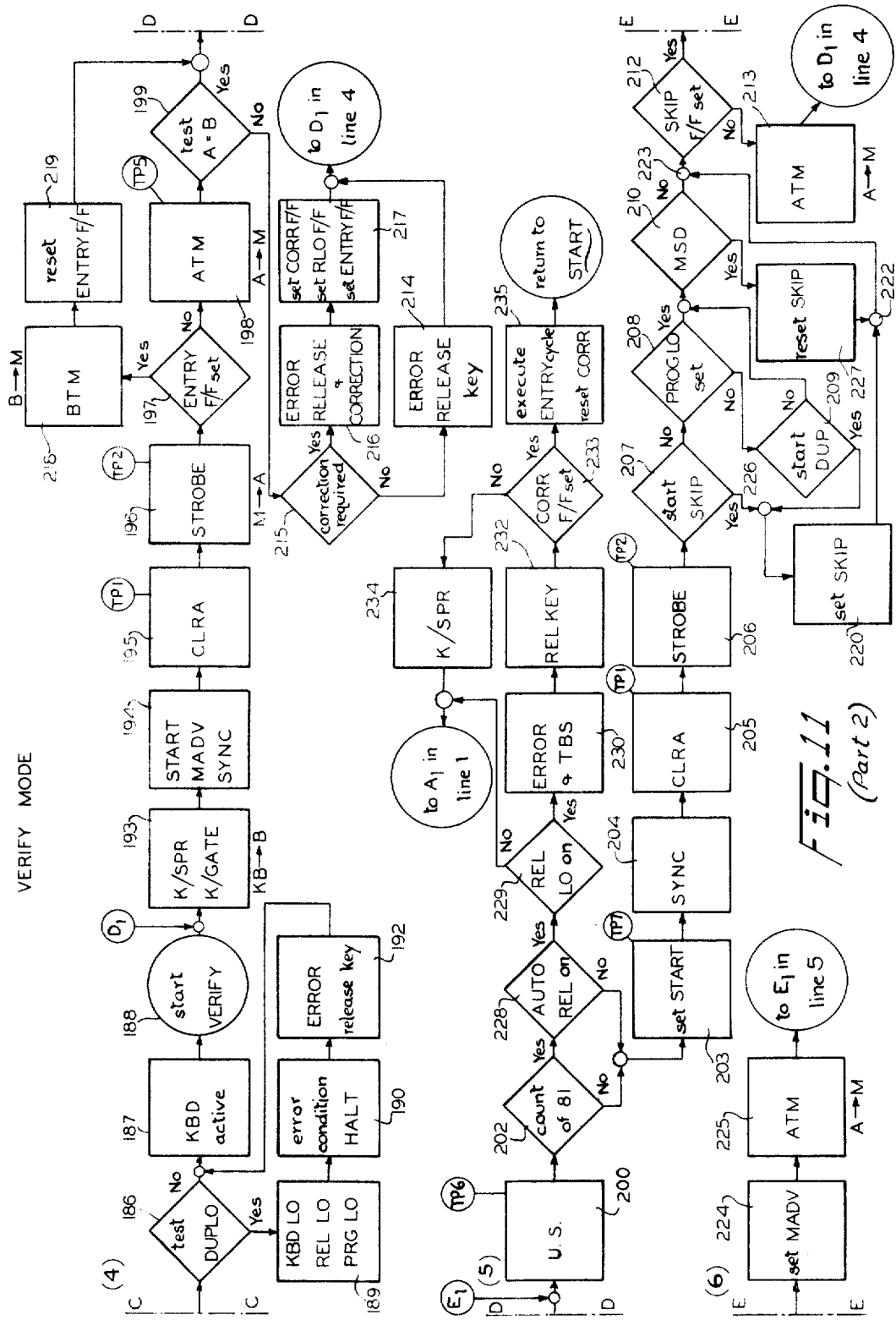
Fig.11 (Part 2)

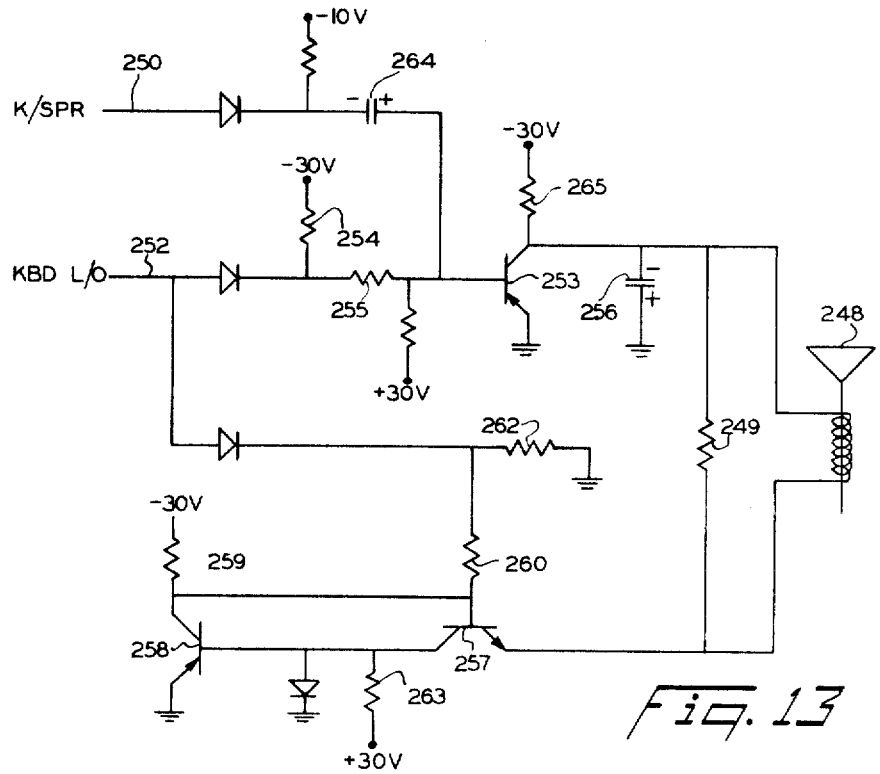
Fig. 13
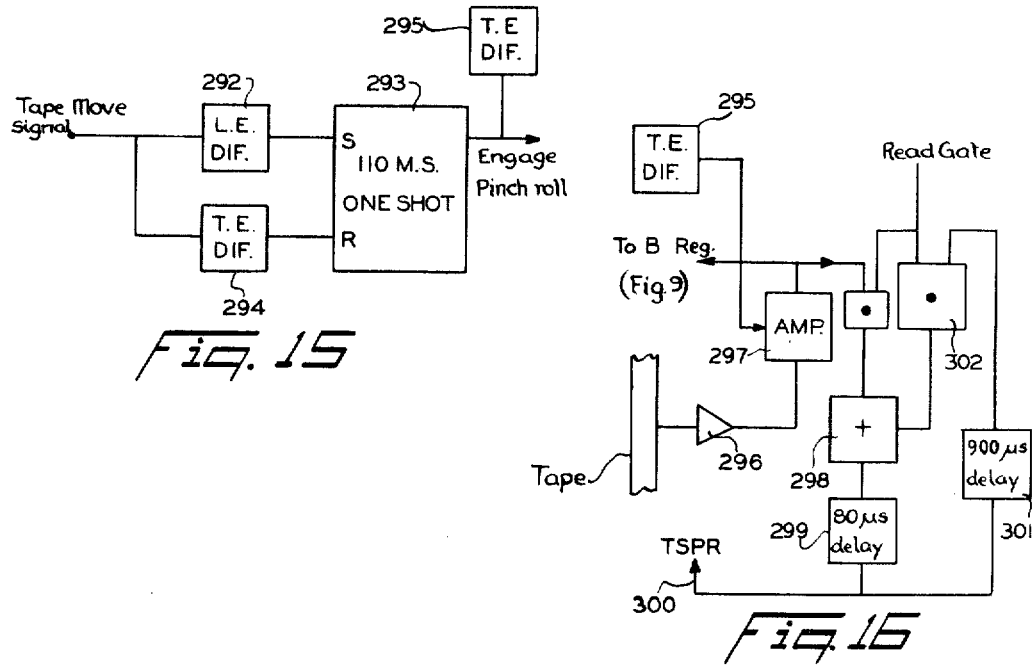
Fig. 15
Fig. 16

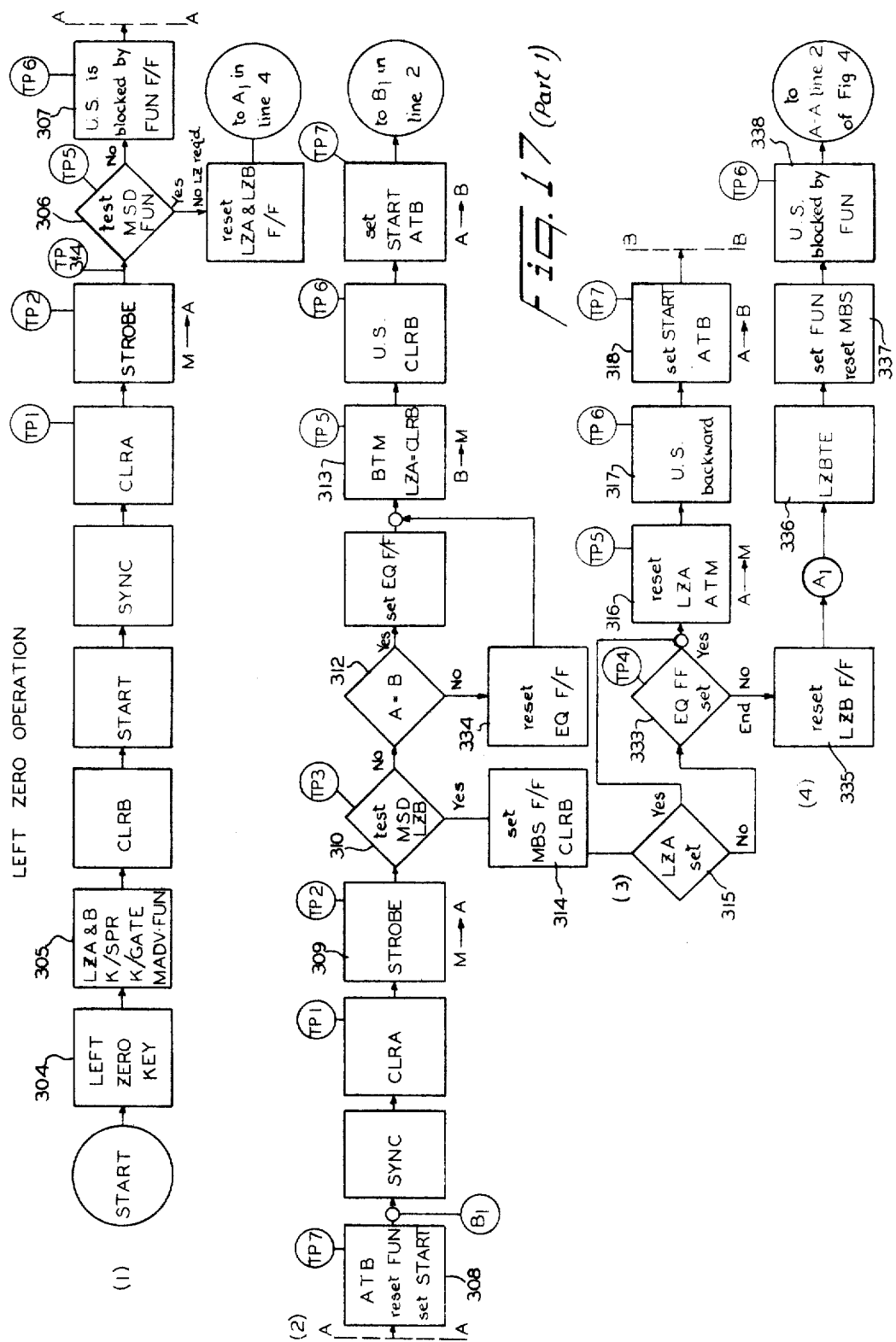
Fig. 17 (Part 1)

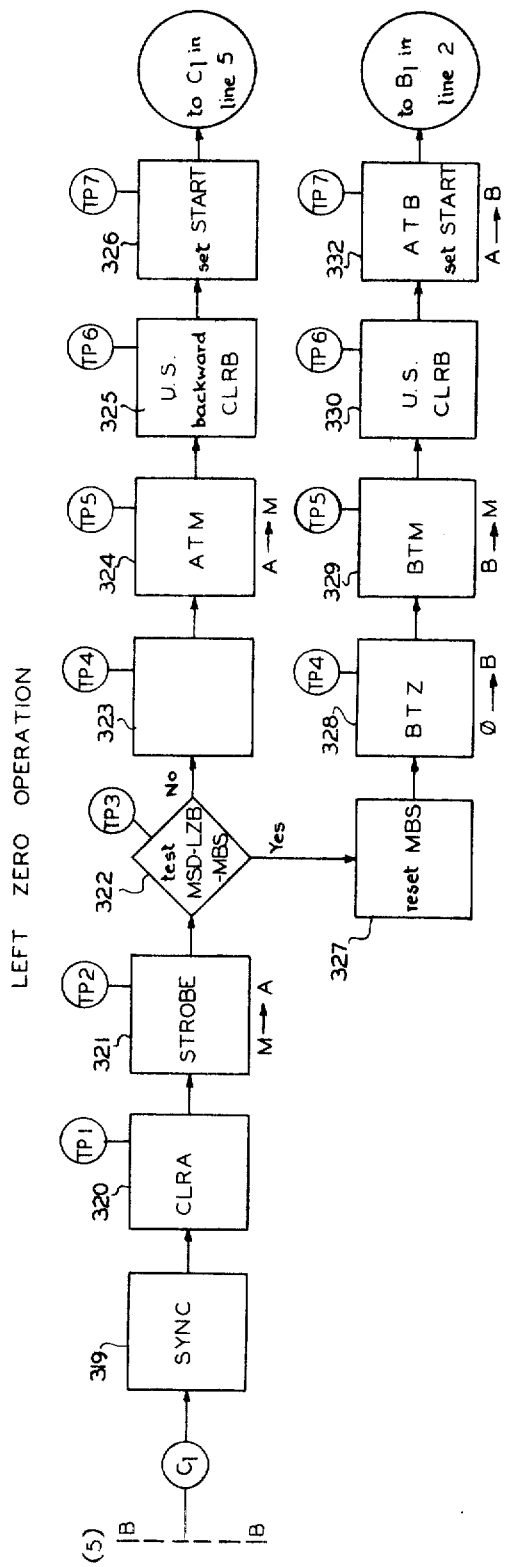
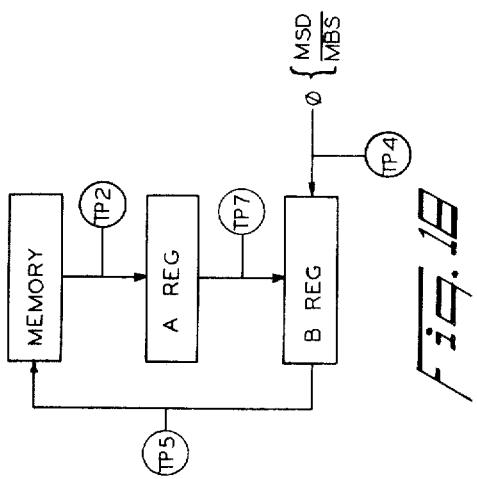

Dec. 9, 1969  G. R. COGAR ET AL  3,483,523
DATA RECORDING AND VERIFYING MACHINE
Filed March 30, 1966  17 Sheets-Sheet 16

Dec. 9, 1969  G. R. COGAR ET AL  3,483,523

DATA RECORDING AND VERIFYING MACHINE

Filed March 30, 1966   17 Sheets-Sheet 17

United States Patent Office 3,483,523
Patented Dec. 9, 1969

3,483,523
DATA RECORDING AND VERIFYING MACHINE
George R. Cogar, Frankfort, Torkjell Sekse, Marcy, and Walter Banziger and Joseph W. Ming, Utica, and Laszlo Horvath, Ilion, N.Y., assignors to Mohawk Data Sciences Corporation, Herkimer, N.Y., a corporation of New York
Filed Mar. 30, 1966, Ser. No. 541,450
Int. Cl. G11b *13/00;* G06f *1/00, 7/00*
U.S. Cl. 340—172.5           35 Claims

ABSTRACT OF THE DISCLOSURE

A machine is provided with both the capacity for recording keyboard-entered data on magnetic tape and for verifying previously recorded data. In the record mode keyed characters are accumulated in a buffer memory until a full data-block (80 characters) is assembled. At that time an automatic release starts the tape drive and records the block. Tape backspacing is then automatically effected to enable rereading of the block for parity and data checking. Automatic program control enables automatic skip and duplicate operations, the latter of which causes some or all of the data of a previously recorded block to be recorded in the next block. In the verify mode recorded blocks are read into the buffer memory and the characters in the memory are then compared one-by-one with characters keyed by the operator from the original source data. An error indication locks the data keys so that the operator must press an error key, retry the data key and then, if an error is still signalled, key in the correct character. After such a correction the tape is backspaced and the corrected block in the memory is written on the tape in place of the erroneous block. Automatic program control permits automatic verification of data which is duplicated in succeeding blocks. This is done by comparing each character of the new block with the corresponding character of the previous block, still stored in the buffer memory, as the new block is being read into the buffer.

---

This invention relates generally to computing apparatus, and has particular reference to a novel data recording machine in which a series of characters keyed into the machine is subsequently recorded on magnetic tape or compared against a series of characters previously read from magnetic tape.

Electronic computer systems can operate most efficiently when the information to be processed is available on magnetic tape. Prior to the development of the machine of the invention, two machines—a card punch and a key verifier—have usually been used to record information in computer systems. In the data recorder to be disclosed herein business and scientific data can be manually recorded and verified on magnetic tape without the need for any intermediate medium.

The data recorder of the invention can operate in either an entry mode or a verify mode, and format programming flexibility is provided for each. In addition, a search mode permits location of any specific block of information. The programming system of the data recorder provides all of the automatic features available in card punch machines and performs all functions hundreds of times faster. Duplication of information common to a number of unit records occurs at microseconds per column speed from program or operator control. This speed, like the speed of skipping and automatic verification, contributes greatly to the overall high speed operation of the machine of the invention and its ability to keep key stroke rhythm even and easy.

The correction of errors which are sensed as soon as they are made has always been a problem for users of card punch machines. The operator knows the error exists but a non-erasable hole has been punched. In the data recorder to be described, the problem can be corrected quickly and easily since the operator needs only to backspace and key in the correct data. This is possible because keyboard entries always go first to a correctable electronic memory and then to the record tape.

Very briefly, the data recorder of the invention includes a keyboard which permits entry of 63 different character codes including alphabet, numerics and special characters. The output media is in the form of a seven channel magnetic tape, and up to 80 data characters can be recorded in each unit record. A magnetic core memory is used to store data to be recorded in a unit record during a recording run, and also to store program patterns. In the entry mode, keyed data is entered into memory until the machine is signalled that the data record is complete. The data is then read (but not erased) from memory and written on the tape after which the tape is backspaced the length of the record just written and the record is read from the tape and compared with the data as it is in memory. In the verify mode, a unit record of data is entered into memory from the tape being verified. The verify operator then transcribes data from the source media and as each character is entered it is compared with the information in memory. Any difference is signalled to the operator.

The primary object of the invention is to provide a unitary data recording and verifying machine wherein information that is keyed into the machine is recorded on magnetic tape or compared against information read from magnetic tape, without the need for additional, intermediate apparatus.

Another important object of the invention is to provide a data recording and verifying machine which can operate more economically and very much faster than conventional card punch-card verifier installations.

A further important object of the invention is to provide a data recording and verifying machine which in a single, relatively compact unit can perform the functions ordinarily performed by a card punch, key verifier and card-to-tape conversion runs.

Another important object of the invention is to provide a data recording and verifying machine wherein the functions of entry and verification are combined in a single device.

Another important object is to provide a data recording and verifying machine having novel means for simple detection, indication and correction of errors.

Still another important object is to provide a data recording and verifying machine which includes a search function that permits a particular record on a tape to be located.

Another important object is to provide, in a machine of the character described, an audible action and alarm cicruit, i.e., a simulated clicking sound upon the depression of a key and a steady tone in the event of an error.

Another important object is to provide, in a machine of the character described, for the generation of a keyboard sprocket which causes the generation and synchronization of signals noting that a contact closure within the keyboard has occurred.

A further important object is to provide, in a machine of the character described, an automatic repeat function which permits repetitive entry of a character if the key for that character is held depressed.

Another important object is to provide a data recording and verifying machine wherein, on tape read, the operator receives the same error indication, and can follow the same corrective procedure, regardless of whether the error indication is caused by blank tape, bad spots on the tape or actual error conditions in a written record. The operator, in other words, is not required to differentiate between the various conditions that can cause the error indication.

Still another important object is to provide, in a data recording and verifying machine, novel means for performing a left zero operation.

Another important object is to provide a data recording and verifying machine which is designed so that various optional features can, if desired, be readily incorporated in the machine, the optional features including such things as an alternate program and a data block counter.

Another important object is to provide a machine of the character described having a simplified tape path arrangement for efficient tape handling.

A further important object is to provide a machine of the character described having a simplified structure for backspacing the tape whereby precise movement is attained.

A still further important object is to provide a machine of the character described having a novel hub construction for removably mounting the tape reel on the machine.

Other objects and advantages of the data recording machine of the invention will become apparent from the following detailed description thereof, read in conjunction with the accompanying drawings which disclose the principles of the invention and a preferred means for carrying them out.

In the drawings:

FIGURE 1 is a fragmentary front perspective view of a data recording machine embodying the invention;

FIGURE 2 is an enlarged, fragmentary front elevation of the control panel of the machine;

FIGURE 3 is a diagrammatic illustration of the core arrangement for one memory position of the machine's magnetic core memory;

FIGURE 6 is a timing chart for the keyboard to memory portion of the entry mode;

Figure 12:
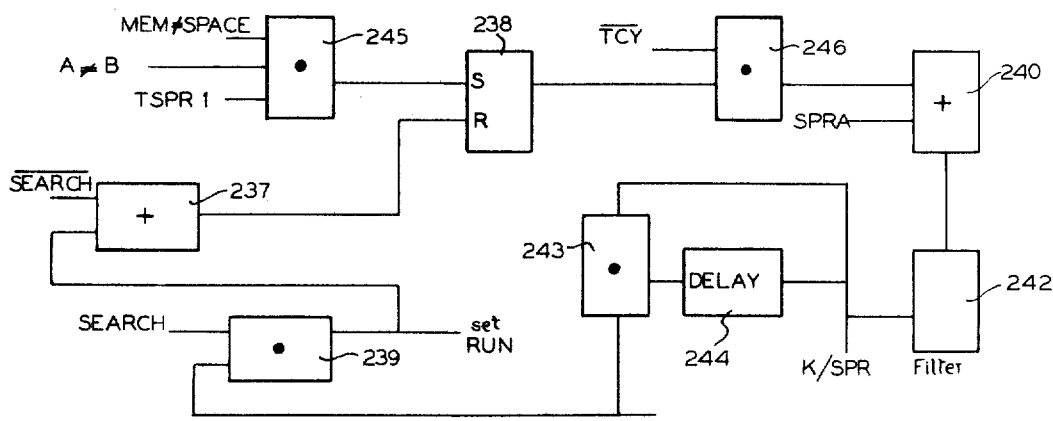
Figure 10:
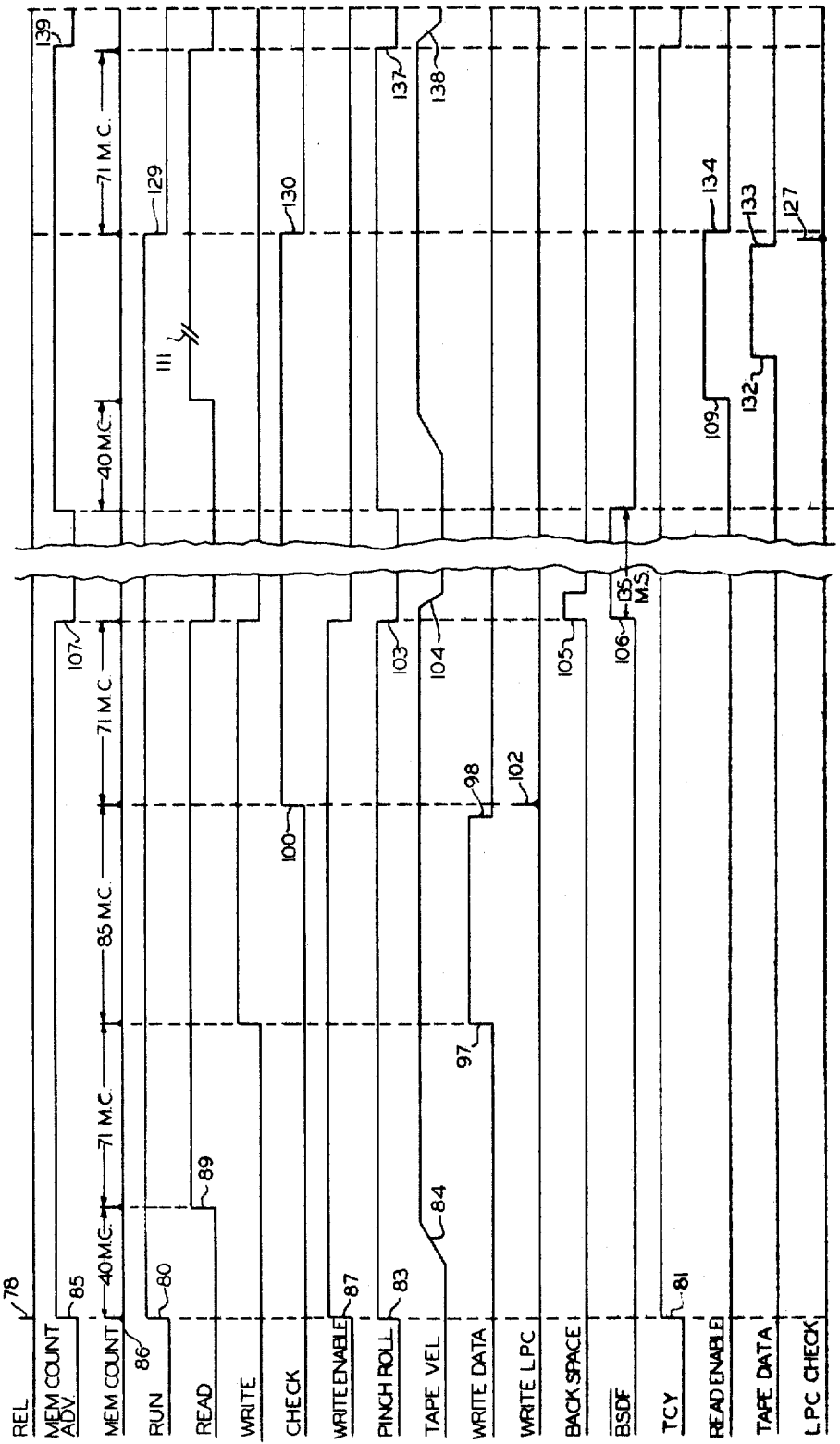
Figure 14:
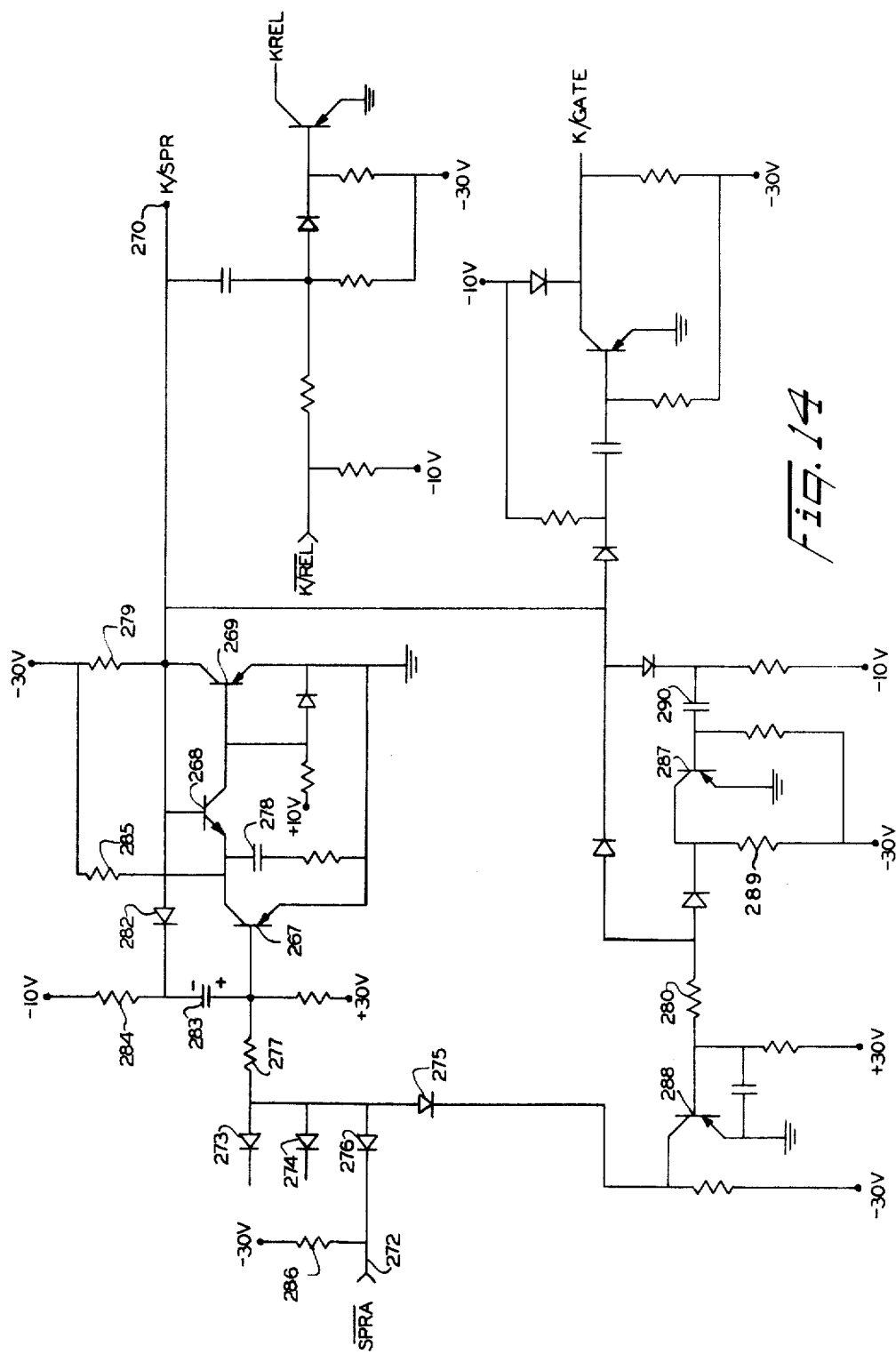
Figure 20:
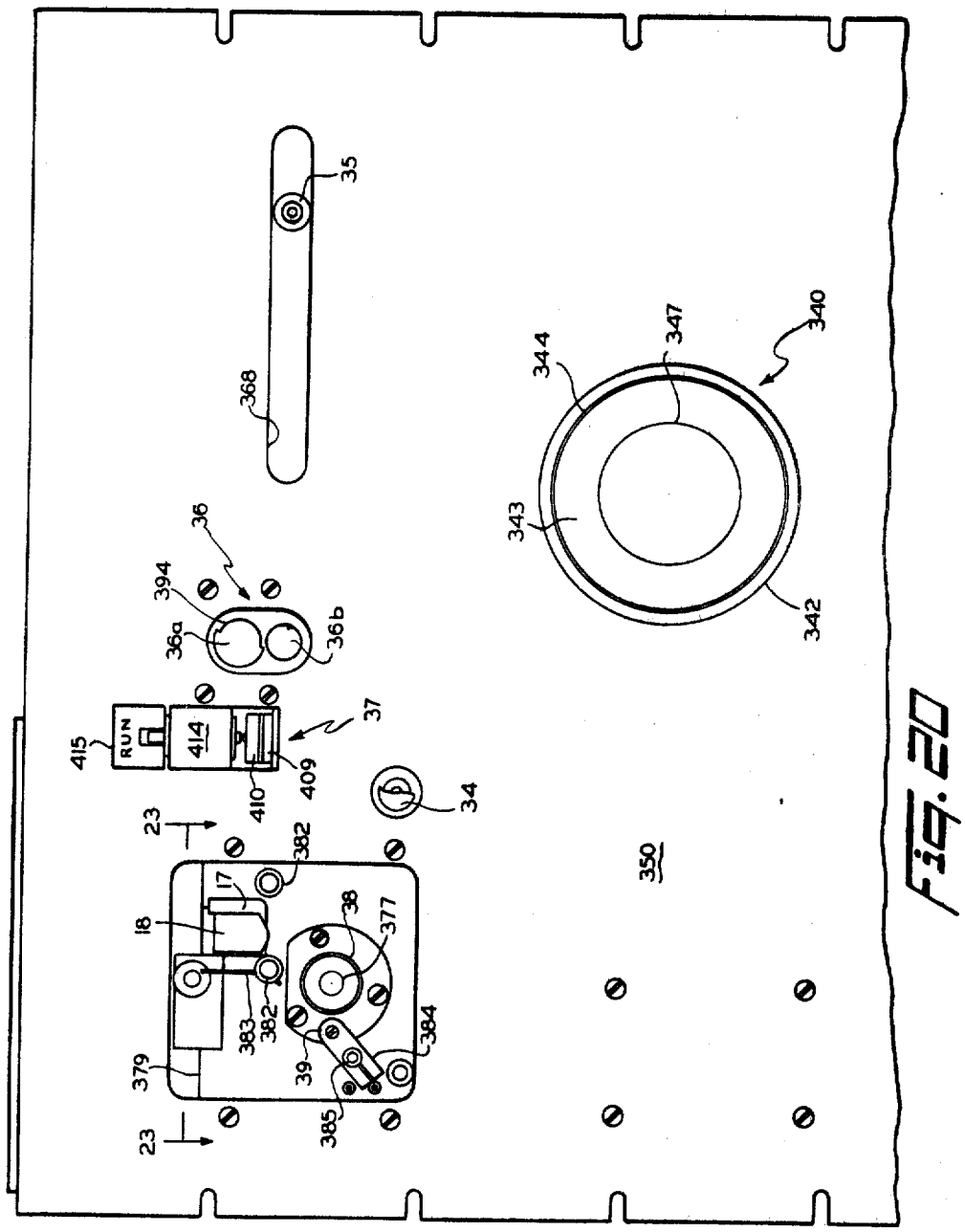
Figure 21:
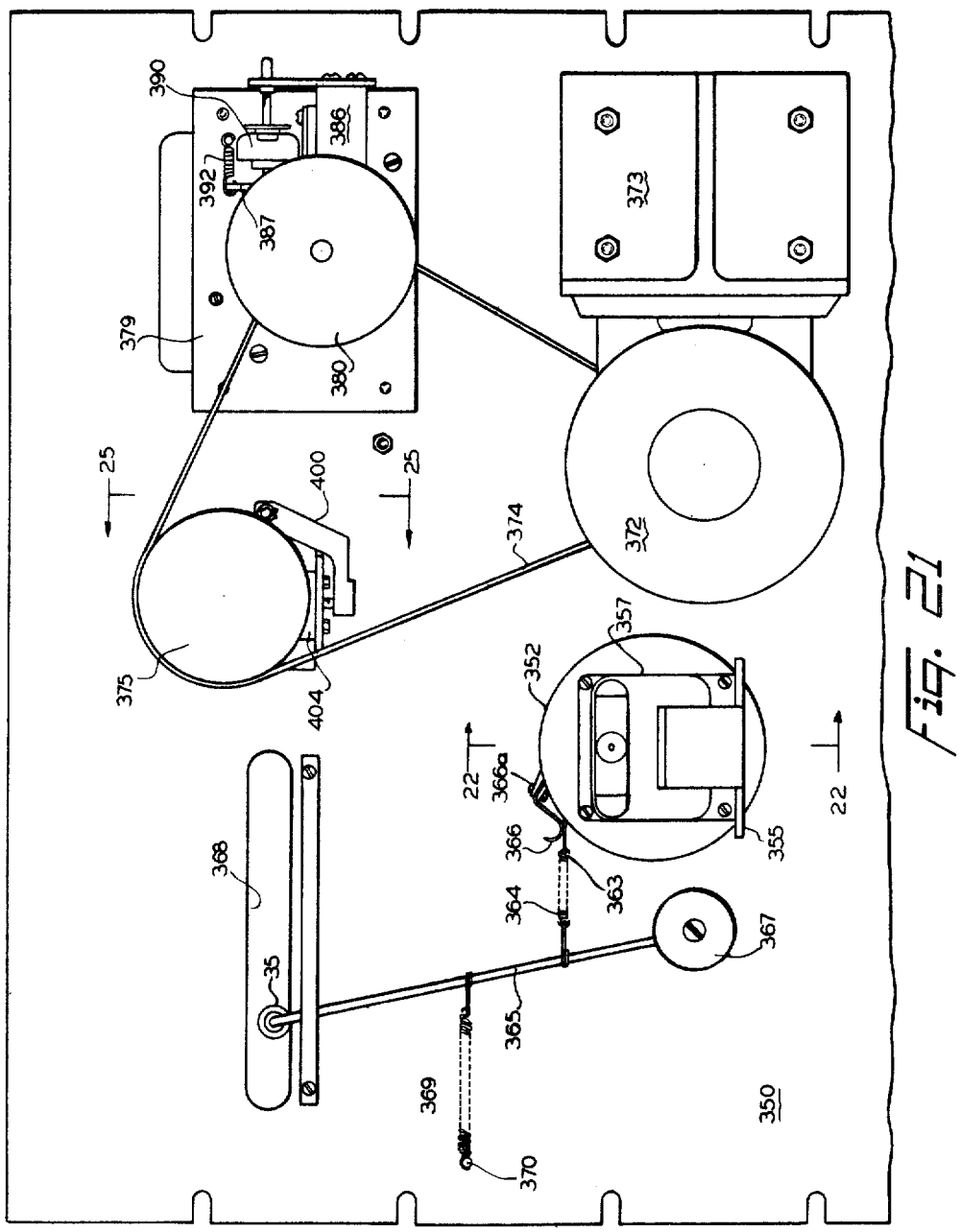
Figure 22:
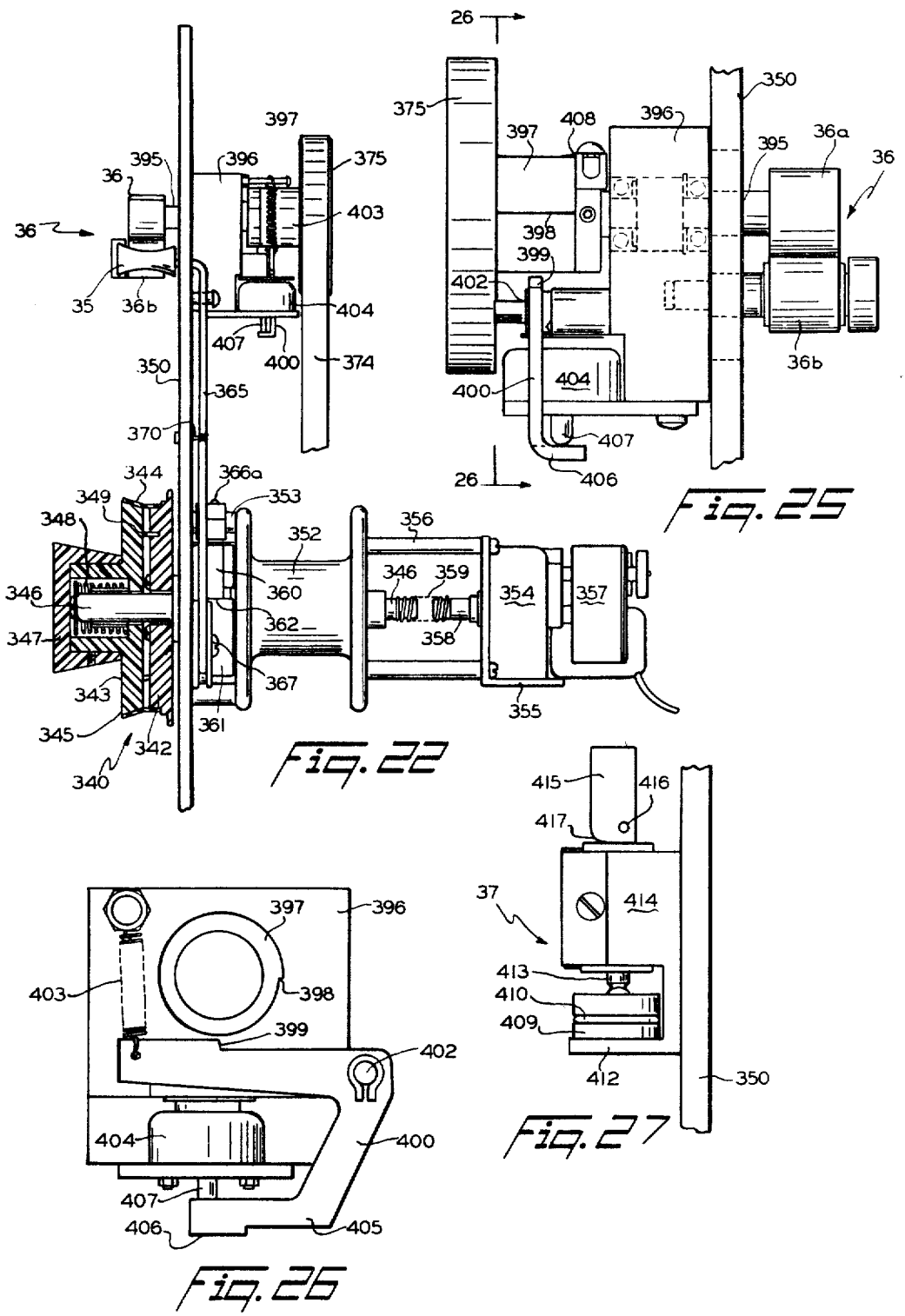
Figure 23:
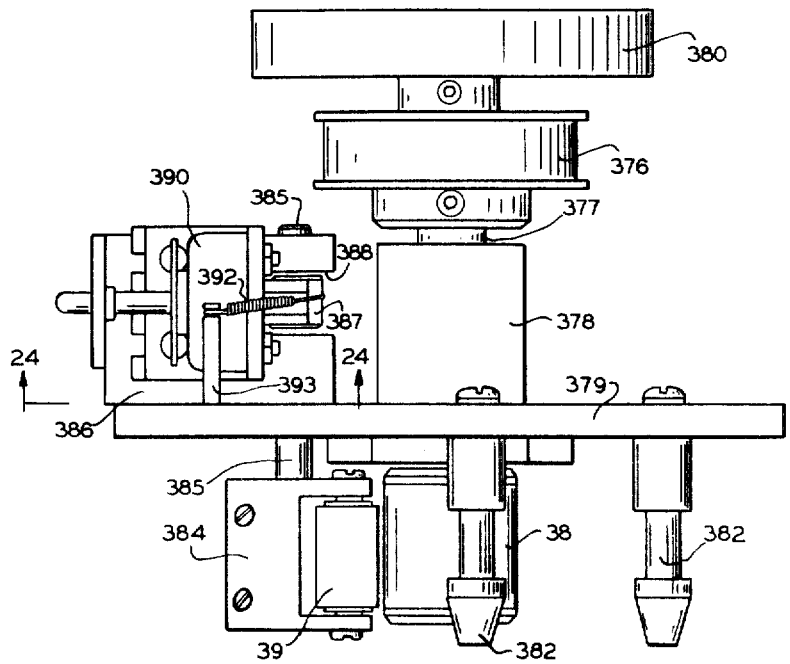
Figure 24:
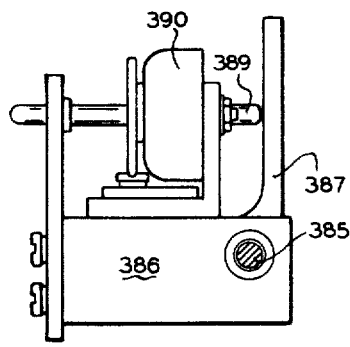

FIGURE 7, composed of Parts 1 and 2, is a flow chart illustrating the sequence of events in the machine during the tape cycle portion of the entry mode;

FIGURES 8 and 9 are block diagrams illustrating the data travel routes during the tape cycle portion of the entry mode;

FIGURE 10 is a timing chart for the tape cycle portion of the entry mode;

FIGURE 11, composed of Parts 1 and 2, is a flow chart illustrating the sequence of events in the machine during the verify mode;

FIGURE 12 is a simplified logic diagram illustrating the manner in which the search mode is carried out by the machine;

FIGURE 13 illustrates the audible action and alarm circuit of the invention;

FIGURE 14 illustrates the circuit for the generation of the keyboard sprocket, including the automatic repeat operation;

FIGURE 15 is a simplified logic diagram illustrating the operation of the timed pinch roll drive circuit;

FIGURE 16 is a simplified logic diagram illustrating the means for generating artificial tape sprockets in the tape sprocket circuit;

FIGURE 17, composed of Parts 1 and 2, is a flow chart illustrating the sequence of events in the machine during a left zero operation;

FIGURE 18 is a block diagram illustrating the data travel routes during a left zero operation;

FIGURE 19 is a diagram illustrating the manner in which data characters keyed into the machine are right-shifted in a left zero field;

FIGURE 20 is a front elevation of the tape deck wall and components mounted thereon;

FIGURE 21 is a rear elevation of the tape deck wall;

FIGURE 22 is an end elevation, partly in section, of the tape deck wall looking from the left in FIGURE 21, the part in section being taken substantially along line 22—22 of FIGURE 21;

FIGURE 23 is a top plan view of the capstan sub-assembly;

FIGURE 24 is a vertical section through the capstan sub-assembly taken substantially along line 24—24 of FIGURE 23;

FIGURE 25 is a side elevation of the backspace mechanism sub-assembly as viewed from the direction of line 25–25 in FIGURE 21;

FIGURE 26 is a rear elevation of the backspace mechanism with the backspace pulley removed; and FIGURE 27 is a right side elevation of the tape pressure mechanism.

As already noted, the data recorder of the invention is characterized by its ability to record information on tape and verify information from tape. The machine is generally indicated by the reference number 10 in FIGURE 1 and includes a lower desk portion 11, and a tape cabinet 12 mounted thereon. The desk portion is arranged so that the operator can sit in front of the machine comfortably and operate the keyboard 13 which is contained in a movable unit for operator comfort. The keyboard unit is supported as shown on the desk top 14 which also has ample room for the source media.

The keyboard 13 has 34 character keys, 13 special function keys and a space bar. The 34 character keys, by using numeric and letter shifts, provide for direct keying of 63 characters including numeric, alphabetic and special characters. The 63 characters are coded using a six bit BCD code. As each character key is depressed a coded combination representing that character is entered into one position of the magnetic core memory.

Each memory position contains six magnetic cores to store data and three cores which may be used to store a program pattern. This arrangement is shown diagrammatically in FIGURE 3 which will be described in more detail hereinafter. The data is moved into and out of memory through various registers which will also be described in more detail farther on. In the entry mode of the machine, data which has been entered into memory from the keyboard is thereafter read from memory and written on tape which is shown at 15 in FIGURE 1, the tape being supplied from a reel 16 mounted in the tape cabinet 12.

The tape 15 used in the machine is seven channel magnetic computer tape and the supply reels 16 are of a standard type. In each frame on the tape, six of the channels will reflect the six BCD code data bits for the character being recorded while the seventh channel will show a parity bit, the recording being done in either even or odd parity. The recording is at a density of 200 bits per inch with fixed length data blocks, or data records, of 80 data characters plus a longitudinal parity character. These records are separated by an inter-record gap of a nominal .75". The tape path, FIGURE 1, leads past an erase head 17, a read-record head 18 and from thence into a storage bin not shown in FIGURE 1, but located in an enclosed portion 19 of the desk 11 beneath the tape cabinet.

As stated above, each of the positions of the magnetic core memory includes three cores for the storage of program patterns. These are identified in FIGURE 3 as cores 1P, 2P and 4P and these cores in each memory position can store one pattern. These patterns automatically operate such machine functions as skip and duplication, and can control the machine in both the entry and verify modes. Eight different program patterns are available in the embodiment of the invention disclosed herein, two of which are used only when the machine is equipped with a self-checking number option.

The program patterns for a particular format of unit records can be placed in memory either by key entry or from a master program strip. In either case, this is always done prior to keying in the data that is to be recorded during the entry mode. The master program strip is the usual way of programming, this strip being a short length of magnetic tape on which the program patterns for a particular run have been recorded. To operate under program control, each data field must have one of the six program patterns in the program cores associated with the most significant position of the field.

A control panel 20 is mounted on the tape cabinet 12, FIGURES 1 and 2, within easy reach of the operator and in the panel are switches that condition the machine to perform functions that are constant during a recording run. The control panel also includes various indicators to be described. The power switch 21 supplies electrical power to the tape capstan drive motor and to the control and logic modules (all of which will be described hereinafter). When this switch is moved to the ON position, the internal controls are automatically cleared to their initial state; memory is not disturbed. The rewind switch 22 is ineffective when power switch 21 is in ON position and if both these switches are placed in the ON position, a safety interlock will render all machine functions inoperative. The rewind switch 22, when in the ON position with the power switch off, supplies power to the rewind motor so that tape is drawn back on the supply reel from the tape bin.

Near the bottom of the control panel 20 is a group of four switches the uppermost of which is the memory selection switch 23 having a DATA position and a FORMAT position. The former is the normal operating position during both the entry and verify operations and data entered from the keyboard or read from tape will be stored in the data portion of memory. When switch 23 is in the FORMAT position the three low order bits of characters read from tape will be stored in both the program and data portions of memory. The remaining bits will enter the data portion of memory. This switch position is used for the entry of a control program and is also one of the three switch settings required for a search operation.

Below the memory selection switch 23 is the mode switch 24 having an ENTRY position and a VERIFY position. With the switch in the ENTRY position, data entered from the keyboard will be stored in memory and, upon depression of the release key (one of the thirteen special function keys), a data block will be written on tape. This switch position is used when either data or program patterns are being entered from the keyboard and is also one of the three switch settings required for a search operation. Normally, when the switch 24 is in the VERIFY position, a character entered from the keyboard will not enter memory but will be compared to a character in memory for the purpose of verification. Depression of the release key with the switch in this position will cause a block of data to be read from tape. This switch position is used when a tape is being read either for verification or to store taped program patterns for a particular run.

Below the mode switch 24 is the release switch 25. When this switch is in its ON position and the memory position counter (to be described) advances from position 80, either as the result of a keyed entry in position 80 or the result of skipping or duplicating through position 80, an automatic release function will occur. Following a tape error, or a correct cycle in the verify mode, the automatic release is inhibited until a tape backspace is executed to re-position the erroneous record. When switch 25 is in its OFF position, a release cannot occur except manually to initiate a search operation.

The bottom switch on the control panel is the automatic duplicate and skip switch 26 which has an AUTO DUP & SKIP position and an OFF position. When the switch is in the first-named position, any skip or duplicate start patterns in the program memory will be effective to initiate their respective operations. When switch 26 is in its OFF position, the skip and duplicate operations can only be initiated manually from the keyboard.

In addition to the switches described above, the control panel 20 includes memory position indicators including a first group of ten indicators 27 used to display the units position of the memory counter and a second group of ten indicators 28 used to display the tens position of the memory counter. The count displayed by lighted indicators shows the memory position that will receive the next data entry or be checked in the case of a verify operation. The memory counter advances sequentially from "Home" or 01 position as entries are made. Following a release operation, the counter is automatically reset to Home position. Each memory backspace operation will reduce the memory counter by one.

The control panel 20 also includes a group of four indicators 29 which are provided to indicate various errors and operating conditions within the machine. Of these, the only one which need be mentioned at this time is the READY light which lights up to show that the machine is in proper condition for operation.

The electronic components of the data recorder are mounted on printed circuit cards (not shown), and all but one of the cards are mounted side by side in a module or card library (not shown) which is located in the enclosed portion 19 of the desk 11, FIGURE 1. The one card that is not mounted in the module is located in the keyboard 13. Mounted on the printed circuit cards is the control and logic circuitry for the machine and also the circuitry for the magnetic core memory. In addition to the electronic components mentioned, the machine is provided with suitable power supply components not shown in FIGURE 1 but which are also contained in the portion 19 of the machine desk.

KEYBOARD

As already noted, the keyboard 13 has 34 character keys, 13 special function keys and a space bar. Very briefly, the purpose of each special function key is as follows: The skip (SK) key, which is effective only when the machine is in entry mode, causes the memory position counter to advance to the next skip termination point in program memory. The duplicate (DUP) key permits manual initiation of a duplicate operation during the entry mode and the automatic verification of a space field in the verify mode. The numeric shift (NUM) key is used when entering a numeric shift character in a position programmed for letter shift. The letter shift (LTR) key is used when entering a letter shift character in a position programmed for a numeric shift.

The release (REL) key is effective only when the release switch 25 is in its ON position except to initiate a search mode. In the entry mode without an error condition, depression of the release key causes the remaining memory positions to be filled with spaces except for DUP fields (if switch 26 is on), and starts the tape cycle at position 81. In the entry mode with an error, depression of the release key starts the tape cycle. In the verify mode, depression of the key will cause the machine to skip to position 81 and start a tape cycle. With the release switch 25 in its OFF position, the search mode can be initiated by depressing the release key for one second and then releasing it.

The error release (ER) key has a dual function. After an error condition has occurred in the machine, this key must be depressed to restore the READY indicator and reactivate the keyboard. However, holding the error release key depressed will not override a subsequent error condition and cause reactivation of the keyboard. To prevent the operator from inadvertently overriding a subsequent error condition, the signal from the error release key is differentiated so that the keyboard can be reactivated only once per depression of the key. The second function of the key is to make the correction, tape backspace, tape erase forward, memory backspace and home keys effective.

The correction (COR) key, effective only when the error release key is held depressed, allows a new character to be written in memory to replace a character found to be in error when verifying. The tape backspace (TBS) key, effective only when the error release key is held depressed, backspaces the tape the length of one data block, usually for the purpose of rewriting a block containing an error. The tape erase forward (TEF) key, effective only when the error release key is held depressed, is used primarily for positioning the tape at the beginning of a run and for by-passing bad spots on the tape encountered during tape entry. In entry mode, the tape is moved forward and what goes by the erase head is erased. In verify mode, the tape moves forward but no erasure occurs.

The memory backspace (MBS) key, also effective only when the error release key is held depressed, reduces the memory position counter by one. A common use for the memory backspace key is to backspace and re-key the correct character in a location when it is sensed that a keying error has been made during data entry. The home (HOM) key, effective only when the error release key is held depressed, will restore the memory position counter to the Home or 01 position.

The left zero (L$\phi$) key is used when the data characters entered for a specified field do not fill the assigned field to capacity and the data is to be right-justified within the field. This operation will be described in detail hereinafter. The last special function key is the multiple code (MC) key which permits the superimposing of multiple characters.

TAPE

Figure 3A:
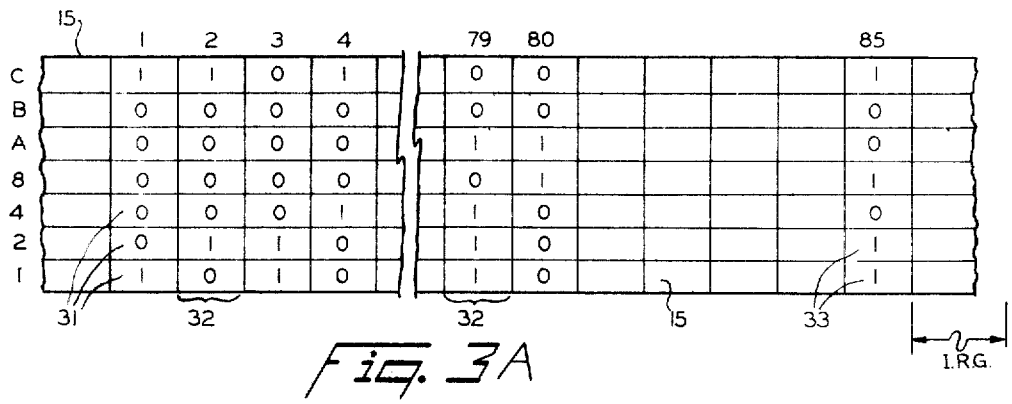
FIGURE 3A is a stylized illustration of a piece of magnetic tape such as is used with the machine of the invention.

Tape 15, FIGURES 1 and 3A, is seven channel magnetic computer tape with its channels or tracks 31 extending lengthwise along the tape and being designated BA8421 to correspond to the bit designations of the BCD code. The bits for the recorded characters are shown as ones or zeroes in various arrangements according to the code, each character being recorded in a vertical frame 32. In FIGURE 3A, the consecutive numbering of the frames along the top of the tape and the channel designations at the left side are for descriptive purposes only and do not actually appear on the tape. Above the "B" bit channel is a channel designated "C" in which the vertical parity bit for each frame 32 of the tape is recorded, the recording being done in even parity in the illustrated embodiment. As previously described, recording is at a density of 200 bits per inch with fixed length data blocks of 80 data characters. Each data block or record includes for each of the seven channels a longitudinal parity character 33 which is written in the 85th position on the tape. The data blocks are separated by an inter-record gap (I.R.G.) of a nominal .75".

The tape 15 extends from reel 16, FIGURE 1, around a guide roller 34, a second guide roller 35 mounted on a tension arm and then between the rollers 36 of a backspace mechanism. From the backspace mechanism, the tape passes through a pressure pad mechanism 37, under the erase head 17 and read-record head 18, and then between drive capstan 38 and pinch roll 39, the mechanical operation of these components to be described hereinafter. Forward movement of the tape is effected by moving the pinch roll 39 into engagement with the rotating capstan which causes the tape to be accelerated to a nominal belocity of 31" per second. At the completion of a recording run, the tape is rewound on the supply reel 16 by setting the pressure pad mechanism 37 to REWIND, turning the power switch 21 to OFF and the rewind switch 22 to ON. When the tape has been completely rewound on the supply reel, the rewind switch must be manually turned to the OFF position.

In the entry mode, the tape is moved in the forward direction and passes under the erase head 17 before passing under the read-record head 18. The erase head operates to completely erase the tape and thereby prevent low level noise which might occur due to variations in track widths or to track misalignment. In the verify mode, on the other hand, no erasure occurs during forward movement of the tape. The tape can be manually backspaced by depressing the tape backspace key which causes the backspace rollers 36 to move the tape backward a nominal 1.125".

Data is recorded on tape by a non return to zero method and in recording, a change in flux represents a 1 bit while no change represents a 0 bit, see FIGURE 3A. The vertical parity bit for each recorded data character is determined by a vertical parity net (not shown) which is connected to the write register flip-flop for the parity character channel, there being such a flip-flop for each of the seven tape channels. The write register is shown diagrammatically at 41 in FIGURES 8 and 9. The longitudinal parity character for each of the seven channels is determined by the condition of the write register flip-flop for that channel after a character has been entered in the 80th memory position. The write register, which is used for writing during a tape write operation, is disconnected and used for checking longitudinal parity during a tape read operation.

ENTRY MODE

Briefly stated, the operation of the data recorder in the entry mode is as follows: (1) Data is entered into memory through the keyboard (constant information may have been retained in memory from the previous record). (2) The machine is signalled when the data record is complete. (3) Data is read from memory (but not erased), vertical and longitudinal parity are calculated and the data, with parity, is written on the tape. (4) The tape is automatically backspaced the length of the record just written. (5) The record is read from the tape and compared bit for bit and for parity accuracy with the data as it is in memory. Any difference is a fault and the machine alerts the operator.

A full 80 character block is always written on tape regardless of the number of characters received in memory. Unused positions in memory are recorded on tape as space codes.

In the operation outlined above, the first step is generally referred to as the keyboard to memory portion of the entry mode while steps (3) to (5) are referred to as the tape cycle portion. Further breaking down the tape cycle, step (3) is usually designated the tape write portion while step (5) is designated the tape read portion, or the read after write check.

In describing the operating modes it should be noted that the machine is provided with a master clock which is a 100 kc. crystal oscillator (not shown), each cycle of the clock having a duration of 10 microseconds. In addition, an eight pulse cycling unit is provided, the pulses of which also have a duration of 10 microseconds each and are designated "Start," "TP1," "TP2," etc. through "TP7." One complete cycling unit, therefore, has a duration of 80 microseconds. A keyboard cycle includes two cycling unit cycles (160 microseconds) and is the time required to enter one data character in memory after the key for that character has been depressed.

To condition the machine for entry mode the power switch 21, FIGURE 2, is set to ON which provides the necessary power as previously described and also causes the master clock to start running. In addition, the memory selection switch 23, mode switch 24 and release switch 25 are respectively set to DATA, ENTRY and ON. The setting of switch 26 will depend on whether skip and duplicate operations are to be initiated by program patterns or from the keyboard.

Describing the entry mode of operation in more detail, the sequence of events is initiated when the operator depresses a series of data and/or function keys corresponding to the data she wishes entered into a particular record. As the data keys are depressed, code combinations representing the keyed characters are entered into successive memory positions in the magnetic core memory, the latter having a total of 100 positions in the embodiment disclosed. Following the entry of a complete record, i.e., the filling of 80 successive positions in the memory, a release cycle is made to occur automatically upon the entry of the 80th character.

Effecting the release cycle deactivates the keyboard and causes the tape, which has been stationary during the keying of the characters, to be accelerated to a velocity of 31″ per second moving it past the erase head 17, FIGURE 1, and read-record head 18. After the tape is moving at a uniform velocity and has moved a distance which will provide the required inter-record gap, the memory contents are accessed at a fixed rate of one character every 160 microseconds and are written in consecutive frames on the tape. Along with the writing of the six data bits for each data character, a vertical parity bit is written, as described above. At the same time, the odd-even condition of the bits in each individual channel is being computed such that following the writing of the 80th character and the passing of tape equal to four frame positions, a longitudinal parity character is written in what would be the 85th position on the tape. In the embodiment of the invention disclosed, the recording is done in even parity.

Following the writing of the longitudinal parity frame, the tape continues to advance for a distance such that after movement of the tape has stopped the read-record head 18 will be approximately centered between the record just written and the next record to be written. Simultaneously with the deenergizing of the pinch roll 39 which has been causing the forward tape movement, the read-record head is switched from record to read and the backspace cam (to be described) is energized causing the backspace rollers 36 to move the tape in the reverse direction approximately 1.125″, or sufficient to move the record just written back in front of the read-record head. After an additional delay to allow the tape to settle, the pinch roll 39 is again engaged, the tape reaches a uniform velocity and the data record just written is passed back under the read head 18 which senses it and transfers the data character by character to a comparison register where it is compared bit by bit and character by character with the contents of memory. At the same time, vertical and longitudinal parity checks are made so that at the end of this second forward pass the machine has determined that the information recorded on tape agrees exactly with what was written.

After the longitudinal parity character has been read by the machine, the tape continues to move far enough so that the read-record head will be located substantially in the center of the inter-record gap when the forward movement of the tape is terminated. Immediately following the deenergization of the pinch roll 39, the keyboard is again activated for the keying in of the subsequent record. In the event that there is a disagreement between the data recorded on tape and the contents of memory or there is a parity error, the machine will stop with the keyboard interlocked and suitable indicator lights lit.

Referring again to the keyboard, certain data keys have the possibility of generating either of two codes, e.g., a numbers code or a letters code. The determination of which code the key generates may be made either by the depression of the numeric shift or letter shift keys, previously described, or by a program in program memory. The numeric and letter shift keys, however, take precedent over the program in memory.

Each key is connected to a common current source through a series resistor (not shown) which in conjunction with all such resistors forms a Kirkoff adder. The resistors thus provide a means for detecting the multiple depression of keys. The current which passes through the closed contacts of a depressed key changes the potential on the other side of the switch from a nominal minus 10 volts to a nominal plus .4 or .5 of a volt causing current to flow through encoding diodes (not shown) that are wired to the particular key. The outputs of these diodes are connected to numbers/letters selection gates, whose outputs are then connected to the keyboard input gates of a storage device designated the B register.

Figure 5:
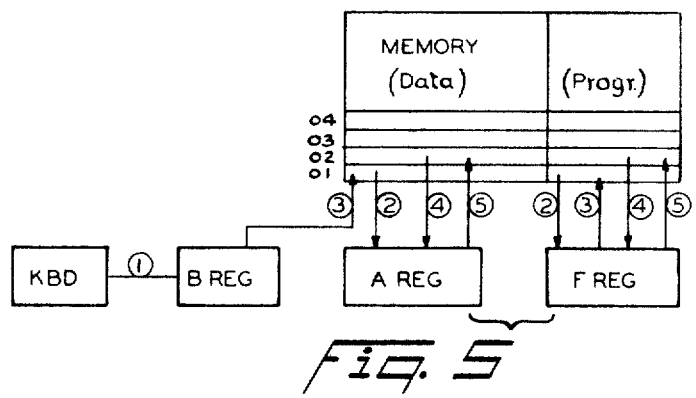
FIGURE 5 is a block diagram illustrating the data travel routes during the keyboard to memory portion of the entry mode.
Figure 4:
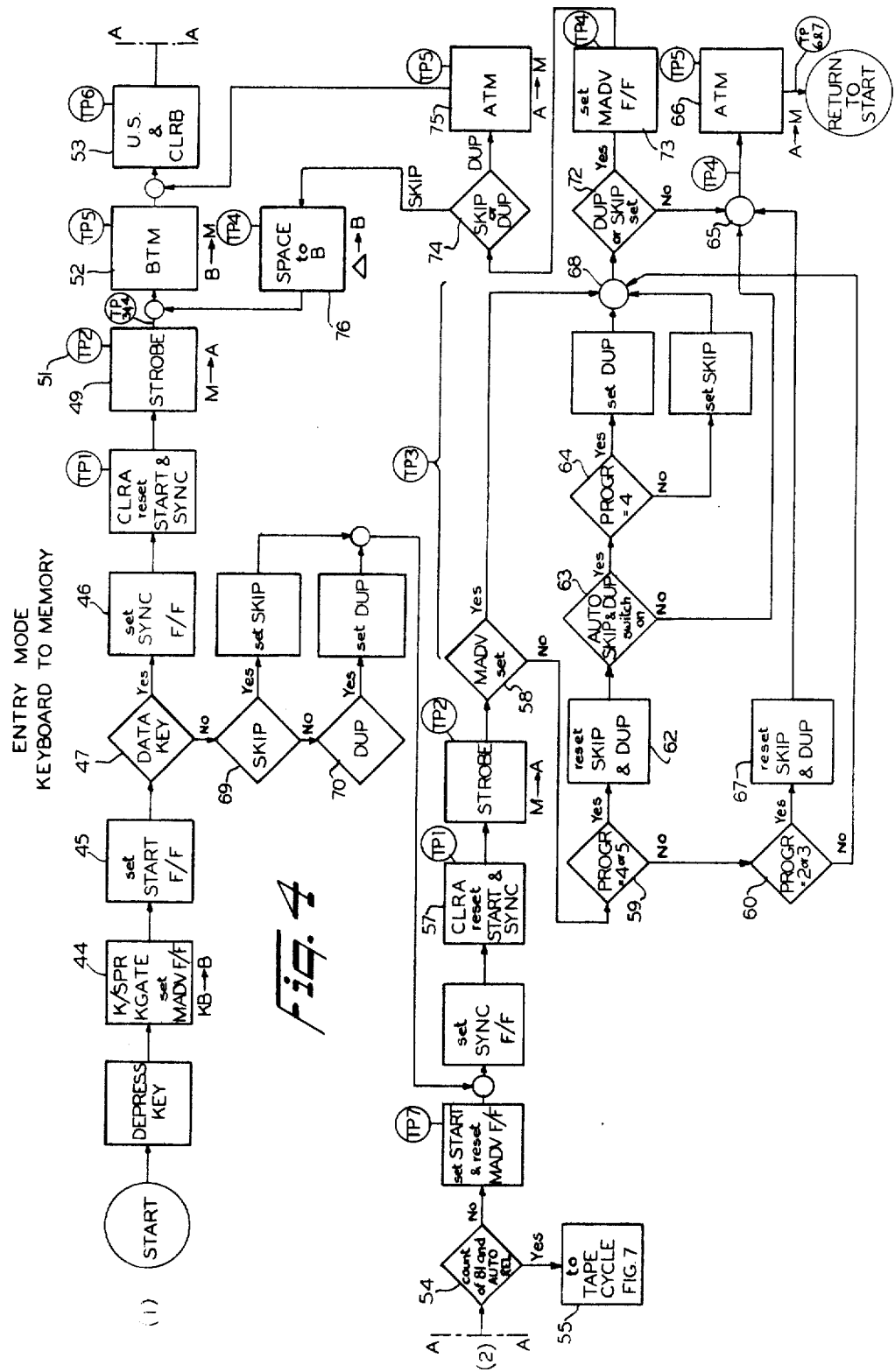
FIGURE 4 is a flow chart illustrating the sequence of events which take place in the machine during the keyboard to memory portion of the entry mode.
Figure 5:
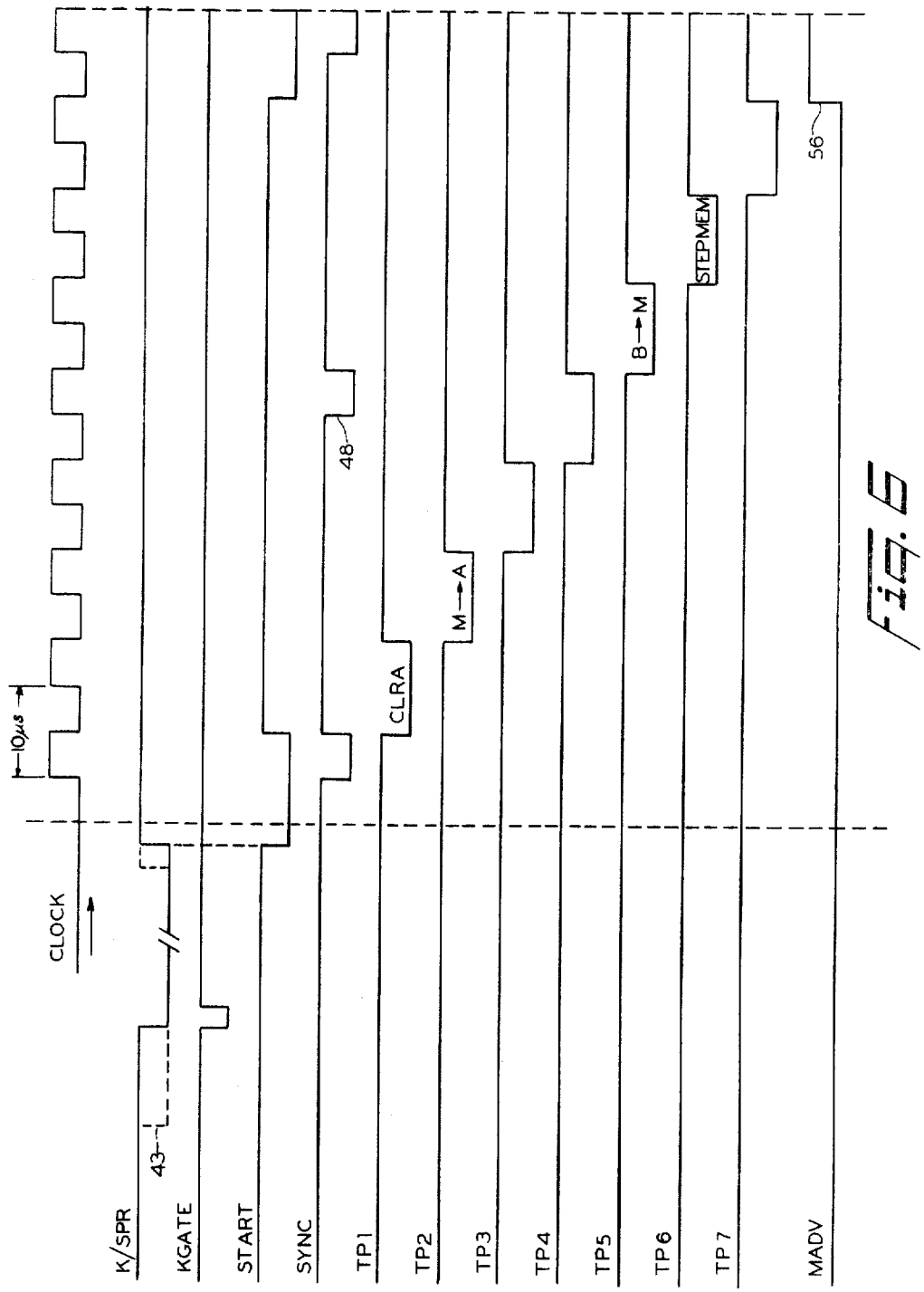

Reference is now made to FIGURES 4, 5 and 6 of the drawings which diagrammatically illustrate the keyboard to memory portion of the entry mode, FIGURE 4 being a flow chart, FIGURE 5 showing data travel routes and FIGURE 6 being a timing chart. As indicated in FIGURES 4 and 6, the depression of a data key generates a keyboard sprocket or drive signal (K/SPR), and the manner in which this is accomplished will be described in detail hereinafter. The duration of the key depression is indicated by the dotted line 43 in FIGURE 6 and it will be seen that the sprocket line, which is common to all data keys, becomes energized shortly after the key is depressed and is deenergized shortly after the key is released.

At the same time that K/SPR becomes energized, the keyboard input gates (K/GATE) go active or switch from the high state to the low state for a nominal period of one millisecond. The purpose of K/GATE among other things is to strobe the keyboard to B register input gates, thus transferring the coded output of the depressed key into the B register. This is indicated below the box 44 in FIGURE 4 by the shorthand designation KB→B. At substantially the same time that K/SPR becomes energized and the data is being transferred from the keyboard to B register, the memory advance (MADV) flip-flop is set as is also indicated in the box 44, FIGURE 4. The operation of the MADV flip-flop will be described presently.

In connection with the description thus far, it should be pointed out that the operation of the data recorder of the invention is by sequential type logic which is to say that, as a general rule, two or more events cause another event to occur. Further, with reference to FIGURE 4 and the other flow charts to be described, it may be considered that steps or occurrences which are listed together in a particular box happen at substantially the same time.

Continuing with the description of FIGURES 4–6, the trailing edge of K/SPR is differentiated causing the START flip-flop to set, see FIGURE 6. The START signal is the first pulse of the eight pulse cycling unit described above. Setting the START flip-flop allows the synchronizing (SYNC) flip-flop to be set, the purpose of the SYNC flip-flop being to insure a discrete start of the cycling unit with reference to the master clock indicated at the top of FIGURE 6. This is accomplished by permitting the SYNC flip-flop to set only on the positive transition of the master clock, see FIGURE 6, and allowing the state of the cycling unit flip-flops, including the START flip-flop, to change only on the negative transition of the clock.

Interposed between the set START block 45 and the set SYNC block 46 in FIGURE 4 is a diamond 47. In the convention employed in the flow chart drawings, a diamond represents a conditional situation, or a question which the machine must ask of itself before proceeding. In the diamond 47, the machine is asking—substantially simultaneously with the setting of the START flip-flop—whether the key that was depressed is a data key or not. If it is, the sequence of events continues without interruption and without there being auxiliary events of a nature to be explained.

Assuming that a data key was depressed, the answer to the question posed by the diamond 47 is YES and the events continue in the sequence shown in line (1) of FIGURE 4. Thus, the SYNC flip-flop is set on the fidst positive transition of the clock to occur after the START flip-flop has been set, FIGURE 6, and this causes the START flip-flop to be reset on the next negative transition of the clock, this causing the SYNC flip-flop to be reset.

The trailing edge of the START signal is differentiated and sets the first cycling unit timing pulse (TP1) flip-flop. The setting of TP1 causes its circuitry to operate so that on the subsequent negative transition of the clock the TP1 flip-flop will reset and the TP2 flip-flop will set. In the same manner, TP2 will reset and TP3 will set; resetting TP3 then causes TP4 to set. Setting TP4 again causes the SYNC flip-flop to set, as indicated at 48 in FIGURE 6, which then allows TP4 to reset. The operation of the SYNC flip-flop in conjunction with TP4 is necessary in that cycling unit initiation begins at TP4 during the reading of data from tape. Resetting TP4 sets TP5, the latter resets and sets TP6 which in turn resets and sets TP7. From the foregoing, it will be evident that all of the cycling unit flip-flops from TP1 to TP7 are set for a precise interval of 10 microseconds, whereas the START flip-flop may be set for a period of between 5 and 15 microseconds depending on the relative timing of the keyboard sprocket trailing edge to the reference clock.

Retracing the cycling unit signals now with reference to FIGURE 4, during TP1 a register designated the A register is cleared, including both program and data bits. During TP2 the read currents from memory are brought up resulting in all the memory cores within the addressed location being driven to the zero state. At the same time, a memory strobe is generated such that the outputs provided by cores changing from the one to the zero state result in the placing of a one bit in the corresponding positions in the A register. This is indicated by the shorthand designation M→A below block 49, the timing pulse corresponding to the block being shown in the circle 51 above the block.

As indicated in FIGURE 4, during TP3 and TP4 nothing happens. During TP5 a B register to memory signal is generated causing the contents of the B register to be transferred to memory. This is indicated by the symbol BTM in box 52 and the designation B→M below it. Simultaneously with the B to memory signal, an F registed to memory signal is generated causing the contents of the F register (which is the program portion of the A register) to be transferred to memory, see FIGURE 5. At the end of TP5, therefore, the addressed memory location contains the same data character as the B register (which is the character that was keyed into the machine), and the A register contains the previous contents of the addressed location. At TP6 the B register is cleared as indicated by the symbol CLRB in box 53.

During TP6, also, the memory is stepped or advanced to its next consecutive location, this being designated as a unit step (U.S.) in box 53. Following TP6, see line (2) of FIGURE 4, the machine must determine whether or not the new memory location that is being addressed is the 81st memory position. If it is, 80 data characters or a complete record will have been entered into memory and a release operation will automatically occur thereby initiating a tape cycle to be described in detail hereinafter. The sequence of events just described is indicated by the diamond 54 and block 55 in FIGURE 4.

If the new memory location is not the 81st, the sequence of events continues as indicated to the right of diamond 54. Thus, the resetting of TP6 causes TP7 to set. The trailing edge of TP7 is differentiated causing the START flip-flop to again set and, at the same time, causing the memory advance (MADV) flip-flop to be stepped to its reset state as indicated at 56 in FIGURE 6. The START flip-flop is reset in the manner described above and again sets TP1 as indicated by box 57 of line (2) in FIGURE 4.

The setting of TP1 referred to just above starts a second memory cycle of the keyboard cycle and again the A register is cleared (CLRA) and the START and SYNC flip-flops are reset. At TP2 memory is strobed and its contents (in the new location) are transferred to the A registed (M→A), both the data and program bits, see also FIGURE 5. At TP3 of the second memory cycle, the machine must determine if the MADV flip-flop is in a set or reset state as is indicated by the diamond 58. As described thus far, this flip-flop was reset at TP7 and nothing has happened to change its state since that time. Accordingly, the answer to the question in diamond 58 is NO and this means that the next thing to happen (still at TP3) will be the interrogation of the program bits that have been transferred from the new location of memory to the F register to see if an automatic skip or duplicate operation is called for. This interrogation is indicated by the diamonds 59 and 60 in FIGURE 4.

In the first diamond 59, the question is whether the program bits are such that either an automatic duplication (program pattern #4) or an automatic skip (program pattern #5) is called for. If the answer to this question is YES, the skip and duplication (SKIP & DUP) flip-flops are reset as indicated by the block 62 and the next event is a further question i.e., whether the AUTO SKIP & DUP switch 26 is on or off as indicated in diamond 63. If the switch 26 is in its ON position, a further question must be asked, diamond 64, which is whether the program pattern is #4 in which case the DUP flip-flop is set or, if it is not #4, it must be #5 and the SKIP flip-flop is set.

Going back now to the diamond 63, if the switch 26 is not ON the program patterns have no effect and automatic skip and duplication operations are prevented. In such cases, the pa'h for the sequence of events goes to the figurative junction point 65 which represents the resetting of TP3 and setting of TP4 during which latter pulse nothing happens. During the next pulse, TP5, illustrated by the block 66, the contents of the A register are returned to memory (ATM). Following TP5, nothing happens during TP6 and TP7 whereupon the keyboard cycle is completed and the machine is ready to receive the next keyed entry which will cause the keyboard cycle to be repeated.

Going back to the diamond 59, if the answer to the question is NO, a further question must then be asked as indicated by the diamond 60. This question is whether either program pattern #2 or #3 is called for. If the answer to this question is YES, the SKIP & DUP flip-flops are reset as indicated by the box 67 and the path for the sequence of events goes to the junction point 65 after which the keyboard cycle is completed as described just above. If, however, the answer to the question in diamond 60 is NO, the path leads to a figurative junction point 68 which is the same point that is reached if either the DUP or SKIP flip-flop has been set as a result of the question asked in diamond 64.

Going all the way back now to line (1) of FIGURE 4, if the key that was depressed was not a data key, the answer to the question in diamond 47 is NO which leads to the further questions in diamonds 69 and 70. These are whether the depressed key was either the SKIP or the DUP key, which are the only two function keys treated in FIGURE 4. If either of these keys has been depressed, its flip-flop is set and the next event that occurs is the setting of the SYNC flip-flop in line (2). When the SYNC flip-flop resets, TP1 sets and then TP1 resets and TP2 sets with the same events taking place that were described above. At TP3, however, the answer to the question in diamond 58 will be YES because the MADV flip-flop will still be set. The path for the sequence of events, therefore, leads to the previonsly mentioned figurative junction point 68.

From the junction point 68, the next event is another question as indicated by the diamond 72, the question being whether the DUP or SKIP flip-flop has been set. If either the SKIP key or the DUP key was manually depressed (diamonds 69 and 70) the answer is YES, and likewise if the machine was programmed for skip or duplication (diamond 59) the answer is YES. With a YES answer, the next thing that happens is the application of a set signal to the MADV flip-flop at TP4, see block 73. Following this, a further question must be asked and this is which flip-flop, SKIP or DUP, was set. This last question is expressed by the diamond 74 and if the DUP flip-flop was set, the contents of the A register, received from memory at TP2, are returned to memory (ATM) at TP5, block 75. This, then, results in the addressed location of memory retaining its previously entered contents which is what the duplication operation consists of.

If, instead of the DUP flip-flop, the SKIP flip-flop was the one that was set (diamond 74), a space code is entered in the B register ($\Delta \to B$), block 76, and thereafter at TP5 the contents of the B register are transferred to memory with the result that the addressed location of memory is now occupied by a space code.

Following either the return of the A register contents to memory, in a duplication operation, or the entry of a space code in memory, in a skip operation, the memory is advanced to its next location (U.S.) at TP6 and thereafter, assuming a NO answer to the question of diamond 54, the MADV flip-flop is reset at TP7. At the same time, the START flip-flop is again set, then the SYNC flip-flop sets and the previously described events occur at TP1 and TP2. Upon reaching diamond 58, however, the answer will now be NO with the result that the further question of diamond 59 must be asked.

At this point in the description of the entry mode, it should be noted that if the machine is programmed for a skip or a duplication operation (by means of a skip or duplication program pattern in the starting position of a data field), the operation will continue automatically through successive memory locations until terminated by a different program code in the most significant position of a subsequent data field. Similarly, a skip or a duplication operation that is manually initiated by depression of the SKIP or the DUP key will continue until terminated by a different program code in program memory.

Accordingly, if the machine is in the course of a skip or duplication operation—whether initiated by a program pattern or manually—when it again arrives at the question of diamond 59, the answer to the question will in most instances be NO. Thus, if the operation was initiated by a program pattern, the latter would normally only occur in the starting position of a data field; if the operation was initiated by key depression, on the other hand, it was undoubtedly because of the lack of any programming to accomplish the same purpose. In either case, a NO answer will cause the question of diamond 60 to be asked and, unless a terminating program pattern is encountered, the answer to this question is NO also.

With a NO answer at diamond 60, the path for the sequence of events leads to the figurative junction point 68 and then to the diamond 72. In a skip or duplication operation, and having progressed as far as the junction point 68, the answer to the question of diamond 72 will be YES because, whether the operation was initiated by a program pattern or manually, either the SKIP or the DUP flip-flop will have been set and nothing in the previously described sequence of events will have caused the flip-flop to reset. Accordingly, the skip or duplication operation will continue through block 76 or block 75 as described above, and will be repeated until a terminating program pattern is encountered (diamond 60), or until memory has been advanced through its 80th position (diamond 54) at which time a release operation will automatically occur. In connection with the foregoing, it will be understood from a reference to the sequence following diamond 59 that a skip operation can be terminated by the initiation of a duplication operation and vice versa, or, a manually initiated skip or duplication will be terminated by any program code greater than one if the AUTO DUP and SKIP switch is off.

While not specifically dealt with in the flow chart of FIGURE 4, it is appropriate here to again mention that the depression of the release key in the entry mode will cause the remaining memory positions to be filled with spaces except for DUP fields (if the switch 26 is on), and start the tape cycle at position 81. This is assuming that the release switch 25 in the control panel, FIGURE 2, is in the ON position.

Before proceeding with the description of the tape cycle portion of the entry mode, it will be helpful to list the machine operations which always occur at or during the same timing pulse of a cycling unit cycle. Thus, at TP1 the A register is always cleared (CLRA). At TP2, the addressed location in memory is read, i.e., the strobing of memory occurs as a result of the application of read currents. During TP2 the contents of memory are thus transferred to the A register (M→A). At TP5, the contents of the A register are transferred to memory (A→M) or the contents of the B register transferred to memory (B→M). Conditionally at TP6, the memory is stepped or advanced to its next consecutive location (U.S.) and the B register is cleared (CLRB). Conditionally at TP7, the START flip-flop is set and the memory advance (MADV) flip-flop is set or reset depending on its previous condition.

Reference is now made to FIGURES 7–10 inclusive, which diagrammatically illustrate the tape cycle portion of the entry mode wherein the data that has been keyed into memory, as described in detail above, is written on tape and then is read from the tape and compared with the data as it is in memory. In these drawings, FIGURE 7 (composed of Parts 1 and 2) is a flow chart, FIGURES 8 and 9 show data travel routes, and FIGURE 10 is a timing chart. As already stated, the advance of memory to its 81st position means that a complete record has been entered and causes a release operation to automatically occur thereby initiating the tape cycle.

The signal for the release operation is indicated by a pulse mark 78 at the top of FIGURE 10 and by block 79 in FIGURE 7. This signal causes the RUN flip-flop to set and TCY to become active as is shown at 80 and 81 respectively in FIGURE 10, and by block 82 in FIGURE 7. At the same time, the pinch roll 39 (FIGURE 1) is energized and causes the tape, which has been stationary during the keying of the characters, to be accelerated to a velocity of 31" per second moving it past the erase head 17, FIGURE 1, and read-record head 18. The energizing of the pinch roll and the acceleration of the tape to full speed are shown at 83 and 84 in FIGURE 10. At this time also, the memory counter is set in operation and is cleared (CCL) to its 01 position, the latter being indicated below block 82 in FIGURE 7 by the shorthand designation MEM CT→1. The memory count operation is also indicated at 85 and 86 in FIGURE 10.

In addition to the above described operations, and simultaneously therewith, the WRITE ENABLE flip-flop is set, shown at 87 in FIGURE 10, and this sets into operation tape write enable signals A, B and C (TWRA, TWRB and TWRC) as indicated in block 82, FIGURE 7. TWRA and TWRB operate two drivers of which TWRA is for four of the tape channels while TWRB is for the remaining three channels and the erase head. TWRC is used to switch the input of the read amplifier off when data is being written on tape.

At 40 memory counts (M.C.) after the RUN flip-flop was set, the READ and memory advance (MADV) flip-flops are set and the memory counter is cleared to its 01 position. See block 88, FIGURE 7, and lines 89 and 86 of FIGURE 10. The duration of each memory count is 160 microseconds which is equal to two clock or cycling unit cycles. At 71 memory counts after the READ flip-flop was set, the WRITE flip-flop sets and the memory counter again returns to its 01 position. This is shown by block 90 in FIGURE 7 and, as indicated below these blocks, the total time of 111 memory counts from the release operation signal is called the START WRITE DELAY, this period of time being provided by the machine to ensure that the tape will have accelerated to proper speed and that there will be the proper inter-record gap.

Following the operations described thus far, and with the machine now conditioned to write on the tape, the sequence of operations is quite similar to that described above in connection with the keyboard to memory portion of the entry mode (FIGURES 4, 5 and 6). Thus, the setting of the WRITE flip-flop causes the START flip-flop to set and this in turn allows the SYNC flip-flop to set in the manner previously described. When the START flip-flop is reset on the next negative transition of the clock (see FIGURE 6), this causes the SYNC flip-flop to be reset and the trailing edge of the START signal is differentiated and sets the first cycling unit timing pulse (TP1) flip-flop as indicated by block 92 of FIGURE 7. During the TP1 the A register is cleared, during TP2 the first position of memory is strobed and its contents are transferred to the A register and during TP3 the contents of the A register are transferred to the B register whereby the latter now has the contents of the addressed memory location.

During TP4 nothing happens and thereafter the machine must answer the question posed by diamond 93 which is whether the memory counter count is greater than 80. Since this will not be the case until a complete record has been written on the tape, the answer to the question is NO and the next operation is the transfer of the contents of the B register to the write register (BTWR) whereby a character is written on tape, this being the character that was in the addressed memory location. This occurs during TP5, and at the same time the vertical parity bit (VPB) is written in the same frame on the tape in the manner described above in the section entitled "TAPE." See also FIGURE 8 showing the data travel routes for the sequence of operations just described.

During TP6 there is a unit step (U.S.), whereby memory is advanced to its next consecutive location, and the B register is cleared (CLRB). Following TP6, the machine must determine (diamond 94) whether the memory count is 85 or not. If not, the resetting of TP6 causes TP7 to set and the trailing edge of TP7 is differentiated causing the START flip-flop to again set and, at the same time, causing the MADV flip-flop to be reset. The START flip-flop allows the SYNC flip-flop to set and when these two flip-flops are reset TP1 again sets starting another memory cycle as is indicated in line (2) of FIGURE 7.

During TP1 the A register is cleared, during TP2 memory is strobed (in the new location) and its contents transferred to the A register (M→A), and during TP3 the contents of the A register are transferred to the B register (A→B). While not specifically shown in block 95 in line (3) of FIGURE 7, nothing happens during TP4 but the machine operations that normally occur during TP5 and TP6 do take place, e.g., the contents of the A register are transferred back to memory (A→M) at TP5 and the B register is cleared (CLRB) at TP6. Thus, in this second memory cycle the contents of the new memory location are not written on the tape during TP5 but are simply returned to memory after which the B register is cleared. During the next pulse, TP7, the START and MADV flip-flops are again set and thereafter the path for the sequence of events leads back to a figurative junction point designated A1 in line (1) of FIGURE 7.

From the junction point A1 the sequence of operations just described repeats itself, this time with the contents of the new memory location being written on tape during TP5 of the first memory cycle. Thus, during each complete sequence of operations from junction point A1 in line (1) to block 96 in line (3) one character is written on tape and the total time consumed is 160 microseconds or one memory count. This sequence of operations continues until 80 characters have been written on tape whereby the memory count will also be 80. The recording of the 80 characters on the tape is indicated in FIGURE 10 between points 97 and 98 on the line designated WRITE DATA.

Referring back to diamond 93 in line (2) of FIGURE 7, when 80 characters have been written on the tape the answer to the question will be YES and the writing of a character on tape, which would otherwise occur at this point, is by-passed as indicated in the drawing. Following TP6, the question of diamond 94 must again be answered and, even though the memory count is greater than 80, if it has not yet reached 85 the answer here will be NO. This will cause the sequence of operations described above to continue on, each time by-passing the tape write operation of TP5 in line (2), until the memory count reaches 85 and the answer to the question of diamond 94 is YES. There will thus be four memory counts without the recording of a character on the tape.

When the memory count reaches 85 the CHECK flip-flop is set, the write register is cleared (WRCLR) to cause the longitudinal parity character (LPC) to be written on the tape, and the memory counter is cleared (CCL) to its 01 position, all as indicated by the block 99 in line (4) of FIGURE 7. These operations are also indicated in the timing chart of FIGURE 10 wherein the setting of the CHECK flip-flop is shown at 100 and the writing of the LPC at 102. Following the operations just described, the pinch roll 39, FIGURE 1, continues to move the tape forward for 71 memory counts so that when the tape stops the read-record head will be approximately centered between the record just written and the next one to be written.

At 71 memory counts after the CHECK flip-flop was set, the pinch roll is deenergized (causing the tape velocity to decelerate to zero) and simultaneously the backspace cam (to be described) is energized, these occurrences being shown at 103, 104 and 105 of FIGURE 10. The backspace cam remains energized long enough to cause the backspace rollers 36, FIGURE 1, to move the tape in the reverse direction approximately 1.125", or sufficient to move the record just written back in front of the read-record head. At the same time that the backspace cam is energized, the backspace delay flop (BSDF) is set and this operates to prevent the various motion control flip-flops from being toggled for a period of 135 milliseconds (135 M.S.) while the tape is allowed to settle. This is shown at 106 in FIGURE 10.

At the same time that the backspace delay flop is set, the READ, WRITE and MADV flip-flops are reset. In addition, the tape write enable signals become inactive, the write register is again cleared (WRCLR) and the memory counter is cleared to its 01 position. The memory counter is also rendered inoperative at this time, as indicated at 107 in FIGURE 10, by virtue of the MADV flip-flop being held reset by the BSDF. These operations are shown in both FIGURE 7 and FIGURE 10 at the set CHECK flip-flop plus 71 M.C. position.

At the termination of the 135 millisecond period referred to above, the memory counter is again set in operation and the pinch roll is energized to again move the tape in the forward direction, this time for the purpose of reading what has just been written. At 40 memory counts after resumption of the operation of the memory counter—or 40 M.C. after termination of the 135 millisecond period—the READ flip-flop is again set, the write register is cleared and the memory counter is cleared to its 01 position. See block 108, FIGURE 7. At this time, the READ ENABLE signal becomes active as indicated at 109 in FIGURE 10.

With the setting of the READ flip-flop a cycling unit cycle commences during which the A register is cleared at TP1 and the contents of the first location of memory are transferred to the A register at TP2 (MTA). See block 110, FIGURE 7. After TP3, the cycling unit (C.U.) is blocked by the read gate (RDGATE) control signal, and subsequent cycling unit timing pulses (TP's) are not generated until a tape sprocket timing pulse, or signal, occurs. Specifically, the read gate prevents the trailing edge of TP3 from setting TP4 and therefore all TP's remain inactive pending the receipt of a tape sprocket (TSPR) signal. The control logic is essentially dormant pending receipt of a tape sprocket, with the A register containing the prior contents of the current memory address and the B register in a state to receive the corresponding character from tape.

In the reading of a character from tape, all bits comprising the character are usually not sensed simultaneously due to the skewing of the tape channels with respect to each other. To ensure that the bits of a given character are properly reassembled, they must be deskewed in the B register. That is to say, the inputs of the B register must be made responsive for a period of time sufficient to ensure that all bits of a given character have been received before the control logic of the machine again becomes responsive. Accordingly, as the first bit in each frame is read from tape and transferred to the B register it also causes the generation of a tape information (TINFO) signal which initiates a de-skew delay period. Since the time required to generate a TINFO signal is variable, the time consumed by this tape read portion of the tape cycle is variable as is indicated by a break 111 in the READ flip-flop line in FIGURE 10. The expiration of the de-skew delay period initiates the tape sprocket signals which are a series of four contiguous timing pulses designated TSPR1, TSPR3, TSPR4 and TSPR5; there is no TSPR2.

Continuing on with line (5) of Part 2 of FIGURE 7, after the cycling unit is blocked, the read-record head 18, FIGURE 1—which has been switched from record to read—senses the first frame of the tape and transfers the information it receives to the B register. This is shown by block 112 where the symbol TINFO indicates that a character is being read from tape and the shorthand designation below the block indicates that the information is being transferred from the tape to the B register. During TSPR1, the contents of the B register are entered in the write register (BTWR) for the purpose of checking longitudinal parity, the information also being retained in the B register for comparison as will be explained. In connection with the foregoing, attention is directed to FIGURE 9 which diagrammatically shows the data travel routes for this portion of the tape cycle.

After entry of the contents of the B register in the write register, the machine must answer the question posed by diamond 113 which is whether the memory count is greater than 80. If the answer is NO, the contents of the B register are compared with the contents of the A register, diamond 114, which is to say that the character in the particular tape frame that was sensed is compared bit by bit with the character that was in the corresponding location of memory. In the course of this operation, still during TSPR1, the character in the B register is checked for vertical parity as indicated by diamond 115. If the contents of the tape agree exactly with the contents of memory and parity is correct, the next thing that happens is the setting of TP4 by TSPR3 whereby a cycling unit cycle is again initiated, see block 116.

After TP4 has been set, nothing happens at TSPR4 but at TSPR5 the B register is cleared as shown by block 117. The setting of TP4 causes the SYNC flip-flop to set, block 118, and when TP4 resets it causes TP5 to set. At TP5 the contents of the A register are returned to memory (ATM) and at TP6 there is a unit step (U.S.) whereby memory is advanced to its next consecutive location, blocks 119 and 120. Following TP6, the machine must determine (diamond 121) whether the memory count is 82 or not.

If the answer to the question of diamond 121 is NO, the MADV flip-flop is held set by the read gate and the trailing edge of TP7 is differentiated causing the START flip-flop to set. After the START flip-flop sets, the sequence of operations is the same as has been described for other cycling unit cycles until TP3, block 122, when the read gate once again blocks the cycling unit. This is the same thing that occurred at block 110 in line (4) and, while not shown in block 122, the contents of the new memory location have been transferred to the A register. The sequence of operations continues with block 112 in line (5) of FIGURE 7 whereby the character from the next consecutive frame on tape is transferred to the B register and then is compared with the character in the A register, all as previously described. Lines (5) and (6) of FIGURE 7 thus illustrate a recurring cycle of operations whereby successive tape frames are read and compared with the contents of successive memory locations until 80 tape frames have passed beneath the read head.

Before proceeding with a description of the machine operations that occur when the answer to diamond 113 becomes YES, it should be noted that if, during comparison, the contents of the A and B registers prove not to be the same, this is an error condition which will cause the duplicate lockout (DUP L/O) flip-flop to set and will also cause the DUP L/O error light 29 on the control panel to be lit, see FIGURE 2. After the DUP L/O flip-flop has been set, block 123 in FIGURE 7, the path for the sequence of operations returns to diamond 115 and then continues with the recurring cycle of operation shown in lines (5) and (6). In the event there is a non-compare in the vertical parity bit, this also is an error condition and it will cause the TAPE ERROR flip-flop to set, block 124. Thereafter, the path leads to block 116 and then continues as described. Once either the DUP L/O or the TAPE ERROR flip-flop has been set because of a non-compare condition, it will remain set until the initiation of a subsequent tape cycle, whether additional errors are found or not.

After a complete record of 80 characters has been compared with the contents of memory as above described, the answer to the question of diamond 113 will be YES, and on the 81st memory count a check is made to determine if there is a longitudinal parity error (L.P.E.) as indicated by diamond 125 and at 127 in FIGURE 10. This check is accomplished by determining the condition of the write register flip-flop for each tape channel as described above in the section entitled "TAPE," the condition of the write register being determined by the information received from the B register, see FIGURE 9.

From diamond 125, the sequence of events leads directly back to block 116 if there is no longitudinal parity error, or, if there is an error, the TAPE ERROR flip-flop is set (block 124) as an intermediate step. Thereafter, the sequence continues as described to the question of diamond 121. At diamond 121, since longitudinal parity was checked on the 81st memory count, the answer will YES causing the RUN and CHECK flip-flops to reset as shown by block 128 in FIGURE 7 and at 129 and 130, respectively, in FIGURE 10.

At the same time, the memory counter is cleared to its 01 position as indicated in FIGURE 10.

In the tape read, or read after write, portion of the entry mode described just above, the actual sensing of the 80 characters on the tape is indicated in FIGURE 10 between the points 132 and 133 on the line designated TAPE DATA. After the complete record has been sensed, the READ ENABLE signal becomes inactive as shown at 134 in FIGURE 10.

At 71 memory counts after the RUN flip-flop was reset, the READ flip-flop is reset and the memory counter is again cleared to its 01 position, block 135 in FIGURE 7. Simultaneously, the pinch roll is deenergized whereupon the tape velocity decelerates to zero as at 137 and 138. At this time also, the TCY signal becomes inactive thereby terminating the tape cycle portion of the entry mode, and continued operation of the cycling unit becomes dependent upon the state of the MADV flip-flop. Since TCY terminates with MADV set and the memory counter has been cleared to 01 position, a memory cycle will occur following the end of TCY which will permit interrogation of the program bits in the first memory location so that an automatic function will be initiated if called for. Thereafter, the memory counter is rendered inoperative as shown at 139 in FIGURE 10.

While the concluding operations just described are taking place, the machine must ask itself one final question which is whether or not the DUP L/O or TAPE ERROR flip-flop was set at any time during the read after write check, see diamond 140 in FIGURE 7. If the answer is NO, the tape cycle will have been completed without error, automatic functions if called for in the first memory location will be executed, the READY light 29 on the control panel (FIGURE 2) will be lighted and the keyboard made active to allow another record to be keyed into the machine, see block 141.

In the event that an error was detected so that the DUP L/O or TAPE ERROR flip-flop was set, the answer to the question of diamond 140 will be YES. It should be mentioned in this connection that even though diamond 140 only refers to the DUP L/O flip-flop this is sufficient because the setting of the TAPE ERROR flip-flop always forces the DUP L/O flip-flop to set (although the converse is not true). A YES answer at diamond 140 will cause the keyboard lockout (KBD L/O) and the release lockout (REL L/O) flip-flops to be set, block 142, the former operating to render the keyboard inactive so that another record cannot be keyed into the machine until the error condition has been recognized. The DUP L/O, TAPE ERROR and REL L/O flip-flops being set also cause the indicator lights 29 which correspond thereto to be lighted. The keyboard lockout flip-flop being set causes the READY light to be extinguished, block 143, thereby signalling to the machine operator that an error condition exists. The DUP L/O being set prevents the initiation of automatic functions.

The most common cause of errors that are detected during a read after write check is a bad spot on the tape which prevents correct recording. To correct the error, it is therefore necessary to erase the bad record and advance the tape past the bad spot. This is accomplished by having the operator carry out the following procedure: (1) The error release key is depressed which causes the READY light to be restored and the keyboard to be made active. (2) The backspace key is depressed while holding the error release key depressed. This causes the tape to be backed up the length of one block, and the REL L/O light 29 will be extinguished. (3) The tape erase forward key is depressed while holding the error release key depressed. This will cause the tape to advance approximately 3", erase the error block and position the tape for rewriting the block in a new location. (4) The release key is depressed which causes the contents of memory to again be written as a data block in the new location on the tape. After the block is rewritten it will again be automatically checked out, if no errors are encountered, normal data entry can be resumed. If, after rewriting the block, the automatic check again detects an error, the bad spot has not been entirely passed and steps (1) through(4) should be repeated.

VERIFY MODE

Verification is provided for by the data recorder of the invention primarily for the purpose of detecting human error. Thus, in the verify mode, information that was previously written on tape is independently checked to make sure that no mistakes were made when the information was originally keyed into the machine. To this end, the entry operator and the verify operator are usually different persons and the latter is usually one with superior ability and experience.

Briefly stated, the operation of the machine in the verify mode is as follows: (1) A unit record of data is entered into memory from the tape being verified. Constant information from the previously verified record is already in memory and can be automatically verified with the new record coming in, this being done in a manner identical to the read after write comparisons except that the comparisons are specified by program codes in program memory. (2) The verify operator transcribes data from the source media. As each key is depressed its coded output is compared with the information in memory. Any difference results in the keyboard lockout flip-flop being set and the READY light being extinguished to signal the operator. (3) If memory advances to its 81st position and no errors have been detected, the operation returns to step (1) above. However, if one or more errors are found, this conditions the machine not to allow another record to enter memory until the incorrect record has been corrected.

To condition the machine for the verify mode the power switch 21, FIGURE 2, is set to ON which provides the necessary power and causes the master clock to start running, all as previously described. In addition, the memory selection switch 23, mode switch 24 and release switch 25 are respectively set to DATA, VERIFY and ON. The setting of switch 26 will depend on whether skip or duplication operations were programmed when the information was originally recorded.

The operation of the machine in the verify mode is diagrammatically illustrated by the flow chart of FIGURE 11 (composed of Parts 1 and 2). Because most of the individual machine operations are the same as those described in connection with the entry mode—although they occur in a different sequence—a timing chart and drawings showing data travel routes are not included in the disclosure of the verify mode.

Having reference now to FIGURE 11, Part 1, and with the machine conditioned for the verify mode as described above, the first portion of the verification procedure wherein a record is read from tape and entered in memory is initiated by depressing the release key, block 145. This operates like depressing any data key in the keyboard to memory portion of the entry mode in that it causes a keyboard sprocket (K/SPR) to be generated, block 146. It also causes the machine to skip to memory position 81, the RUN flip-flop to set and the tape cycle (TCY) signal to become active, block 147. As in the entry mode, at the same time that K/SPR becomes energized the keyboard input gates (K/GATE) go active. In addition, the trailing edge of K/SPR is differentiated causing the START flip-flop to set, see block 148.

At the same time that TCY becomes active, the pinch roll is energized which causes acceleration of the tape to its full velocity, see FIGURE 10. In verify mode, the tape is not erased as it moves forward beneath the erase head 17, FIGURE 1. Setting the START flip-flop allows the SYNC flip-flop to be set as already described, block 149, and on the next negative transition of the clock the START flip-flop resets causing the SYNC flip-flop to be reset. Setting the START flip-flop initiates a cycling unit cycle, or clock cycle, and at TP7 the MADV flip-flop is toggled, block 150. Thereafter, at 40 memory counts (M.C.) after the RUN flip-flop was set, the READ flip-flop is set and the memory counter is cleared to 01 position, block 152 (cf. FIGURE 10). Following this, at TP1 the A register is cleared, block 153, and at TP2 the contents of the first location of memory are transferred to the A register (MTA). After TP3, the read gate blocks the cycling unit and tape sprocket signals take over.

At TP3, the machine must ask itself the question posed by diamond 154 which is to determine from the F register (the program portion of the A register) whether an automatic duplication operation should be started. If the answer is YES, the DUP flip-flop is set, block 155, and the sequence of operations then leads to block 156; if the answer is NO, the sequence leads directly to block 156. In either case, the next operation is to sense the first frame of the tape and transfer the information received (TINFO) to the B register (T→B). Following this, the machine must determine (diamond 157) if the memory count is 81 and, if not, it must determine (diamond 158) if the character received from tape has a vertical parity error. If the answer is YES, the TAPE CHECK flip-flop is set, block 159, and the sequence of operations leads to diamond 160; if the answer is NO, block 159 is by-passed.

The next operation is a further question (diamond 160), which is whether or not the DUP flip-flop is set. If the answer is YES, it means that an automatic duplication operation was called for by program memory (diamond 154) which means that the information in the tape record now being verified should be exactly the same as the information in the previously verified record (constant information), such identity continuing until terminated by a different program code. Accordingly, with a YES answer, the information in the A register is compared with the information in the B register as is indicated by diamond 162. Since the contents of the A register are memory location contents (block 153) carried over from the previous record, the comparison is thus between corresponding frames of the present and immediately preceding records.

If the contents of the A and B registers are not the same, the dup lockout (DUP L/O) flip-flop is set, block 163, and the sequence of operations continues on to block 164. On the other hand, if the contents of the A and B registers are the same, block 163 is by-passed. In the event that the DUP flip-flop was not set in the first place, whereby the answer to diamond 160 is NO, diamond 162 and block 163 are both by-passed as shown in the drawing.

At block 164, TP4 is set by TSPR3 whereby operation of the cycling unit is resumed. Thereafter, the contents of the B register are transferred to the A register (BTA) and then the B register is cleared (CLRB), blocks 165 and 166. The setting of TP4 causes the SYNC flip-flop to set, as previously described, and at TP5 the contents of the A register are transferred to memory (ATM) whereby the frame that was read from tape is now stored in memory, see blocks 167 and 168. At TP6 memory is advanced to its next consecutive location (U.S.), block 169 and thereafter the machine must determine if the memory count is 82, diamond 170.

If the answer to the question of diamond 170 is NO, the START and MADV flip-flops are set, the SYNC flip-flop sets, the A register is cleared and memory is strobed to transfer the contents of the new location to the A register, all as described above and as indicated by blocks 172–175, inclusive, in line (3) of FIGURE 11. Following the memory strobe, the cycling unit is again blocked at TP3, block 176, and the sequence of operations leads back to diamond 154 at the start of line (2). At diamond 154, it must again be determined from the F register whether or not an automatic duplication operation should be started, and thereafter the next frame of tape is sensed and the information transferred to the B register. Lines (2) and (3) of FIGURE 11 thus illustrate a recurring cycle of operations during which successive tape frames are stored in memory until 80 memory positions have been filled.

After a full tape record has been entered in memory the answer to the question of diamond 157 will be YES following which there will be a check to determine if there is a longitudinal parity (L.P.) error, diamond 177. If an error exists, the TAPE CHECK flip-flop will be set, block 178, after which the path for the sequence of operations leads to the figurative junction point 179 preceding block 164. If there is no L.P. error, block 178 is by-passed as shown. From junction point 179, the operations are as shown in blocks 164–169, inclusive, and upon reaching diamond 170 the answer to its question will now be YES.

With the memory count at 82, the RUN flip-flop is reset and the memory counter cleared to 01 position, block 180. At 71 memory counts (M.C.) after the RUN flip-flop was reset, the READ flip-flop resets and the TCY signal becomes inactive, block 182. Following this, the question of diamond 183 must be answered which is whether the TAPE CHECK flip-flop was set by reason of a parity error. If the answer is YES, the keyboard lockout (KBD L/O) and release lockout (REL L/O) flip-flops are set, block 184, causing corresponding indicator lights 28, FIGURE 1, to be lit. In addition, the READY light is extinguished so that the operator is signalled of the error condition. Having thus been signalled, the operator follows a standard procedure which is to backspace and release. This is accomplished by depressing the tape backspace (TBS) key while holding the error release key depressed, block 185, and thereafter the release key is depressed as indicated by block 145. This corrective procedure is more fully described hereinafter under the heading "TAPE ERRORS."

If the TAPE CHECK flip-flop was not set, the answer to the question of diamond 183 is NO and the path then leads to diamond 186 in line (4) of FIGURE 11. Here the question is whether or not the duplicate lockout (DUP L/O) flip-flop was set by reason of a non-compare at diamond 162. If the answer is NO, the keyboard is active, block 187, and the verify operator can start to key in data from the source media, circle 188. If the answer is YES, the keyboard lockout, release lockout and program lockout (PRG L/O) flip-flops are all set, block 189, the PRG L/O and DUP L/O being one and the same. The setting of these lockout flip-flops causes the operator to be signalled of the error condition, block 190, which in this case is an automatic verify error.

When an automatic verify error occurs (because of a discrepancy in data fields programmed for automatic duplication), the operator must manually verify the automatic duplication fields to ascertain which characters are in error. To do this, the error release key must be depressed, block 192, to restore the READY light and reactivate the keyboard whereupon the sequence of events proceeds as indicated by blocks 187 and 188. From circle 188, the keying in of a character from the source media— whether an error condition exists or not—causes the operations of blocks 193–196 to occur whereby the keyed character is transferred to the B register and the contents of the addressed memory location are transferred to the A register. These operations are the same as previously described in connection with the keyboard to memory portion of the entry mode.

Following the transfer from memory to the A register at block 196, the machine must determine whether or not the ENTRY flip-flop is set, diamond 197. At this point in the description it may be assumed that it has not been set and the next operation is the return of the A register contents to memory, block 198. Simultaneously, the contents of A and B registers are compared, i.e., the character received from tape is compared with the character keyed into the machine by the verify operator, see diamond 199.

If there is no discrepancy, memory is advanced to its next location (U.S.) block 200. Thereafter, the machine must determine if the memory count is 81, diamond 202, and if not, another memory cycle commences as indicated by blocks 203–206.

Following the strobing of memory at TP2, during which the program will have been transferred to the F register, the bits are interrogated to see if an automatic skip operation is called for, diamond 207. If not, the machine must determine if the program lockout flip-flop has been set, diamond 208, and if it has not, the machine then determines whether an automatic duplication operation is called for, diamond 209. If the answer to this last question is NO, the next question is whether or not the machine detects a most significant digit (MSD), diamond 210. If not, the machine then ascertains, diamond 212, whether or not the skip flip-flop has been set and this completes the interrogation of the program bits.

With a NO answer to the question of diamond 212, the contents of the A register are returned to memory, block 213, and the machine is ready to have the verify operator key in the next character from the source media, block 193. Thereafter, the sequence of operations described just above is repeated for each character that is keyed in. In the course of these operations, if there is a discrepancy between the contents of the A and B registers for any character, the answer to diamond 199 is NO and the sequence of operations must be modified.

When a discrepancy between the keyed character and the character in memory occurs, the READY light will be extinguished to notify the operator, the keyboard will be rendered inactive and the memory position counter will not advance. The operator then depresses the error release key, block 214, which restores the READY light and reactivates the keyboard so that she can make another keying attempt, block 193 to diamond 199. If the discrepancy is the fault of the verify operator and the latter hits the correct key on a subsequent attempt, the answer to diamond 199 will become YES and verification can continue as previously described. If, however, the error indication persists after two or more attempts, with the operator making sure the correct key is being keyed, it can be assumed that the character stored in memory is in error and must be corrected, see block 215.

To correct the error, the incorrect character in memory must be replaced by the correct character. To do this, the operator depresses the error release key to reactivate the keyboard and then depresses the correction key while holding the error release key depressed, block 216. This causes the correction (CORR), release lockout (RLO) and ENTRY flip-flops to be set, block 217, whereby the machine is conditioned for the entry of one character. In addition, the REL L/O light 29 on the control panel 20, FIGURE 2, will be lit and will remain so after the correct character has been keyed in the machine.

The correct character is keyed in the machine through the operations of blocks 193–196, and at diamond 197 the answer will now be YES since the ENTRY flip-flop was set at block 217. This causes the correct character to be stored in memory, block 218, after which the ENTRY flip-flop is reset, block 219, and the verification continues as before.

Referring back now to block 206 and the following diamonds wherein the program bits of the addressed memory location are interrogated, if the machine is programmed for the start of an automatic skip operation at this point the answer to diamond 207 is YES and this causes the SKIP flip-flop to be set, block 220. The sequence of operations then continues through the figurative junction point 222 to the junction point 223 and the question of diamond 212. Here the answer will be YES which causes the MADV flip-flop to be set and the contents of the A register returned to memory. See blocks 224 and 225 in line (6) of FIGURE 11.

Following the transfer from the A register to memory, the latter is advanced to its next location, block 200, and, if the memory count has not reached 81, the sequence of operations will proceed through blocks 203–206 and from thence through diamonds 207, 208, 209 and 210 to diamond 212 where the answer will be YES as long as the SKIP flip-flop remains set. This will cause a recurring cycle of operations back through blocks 224, 225 and 200 wherein the contents of each successive memory location are retained in that location until the automatic skip operation is terminated. When this happens, the answer to diamond 212 will be NO and the verify operator will resume keying characters in the machine (block 193 et seq.).

Referring now to diamond 208, if the program lockout flip-flop was set as a result of an automatic verify error, block 189, an automatic advance across fields programmed for automatic duplication is prevented and the possibility presented by diamond 209 is by-passed. If, however, the answer to the question of diamond 208 is NO, and the answer at diamond 209 is YES, the sequence of operations leads to the junction point 226 and then to block 220. If the machine is programmed for an automatic duplication operation, therefore, this causes the SKIP flip-flop to set and the ensuing operations are the same as if the machine had been programmed for an automatic skip operation, described just above. In the event that the answer at diamond 210 is YES, the SKIP flip-flop is reset, block 227, and the sequence of operations leads through the junction points 222 and 223 to diamond 212. At the latter, the answer will be NO and verification will continue in the normal manner (block 193 et seq.).

When the memory count reaches 81, the answer to the question of diamond 202 will be YES and the machine will have to determine whether the release switch 25, FIGURE 2, is on, diamond 228. If the switch is not on, the operations that follow are as indicated by blocks 203–213, inclusive, and then terminate because a complete record will have been verified. With the switch 25 on, the machine must determine whether or not the release lockout flip-flop has been set, diamond 229. If not, an automatic release will occur and the next record on tape will be stored in memory as described in detail above.

If the release lockout flip-flop was set either by reason of an automatic verify error, block 189, or because of a correction during verify, block 217, an automatic release cannot occur and, as already noted, various indicator lights 28, FIGURE 2, will be lighted to signal the operator of the error condition. In such case, the operator depresses the tape backspace key, block 230, while holding the error release key depressed and this causes the tape to be backed up the length of one record. The operator then depresses the manual release key, block 232, whereupon the machine must determine whether the correction flip-flop was set during the verification or not, diamond 233. If not, a keyboard sprocket (K/SPR) is generated, block 234, and the tape record that has been backspaced is again read into memory for verification, block 147 et seq.

If the correction flip-flop was set during verification (at block 217), it means that corrected data was keyed into memory and the entire corrected record is written on the tape replacing the incorrect record and causing the correction flip-flop to be reset, block 235. The recording of the corrected record on the tape is the same as the tape cycle portion of the entry mode, and after the record has been written the usual read after write check will occur.

SEARCH MODE

A search mode is provided by the data recorder of the invention to enable a particular record on tape to be quickly located. A common use of this mode is to locate the last record of an unfinished group, as for example, to find the point at which work was interrupted the previous day.

Briefly stated, the operation of the machine in the search mode is as follows: (1) The tape block identifier is keyed into memory in the positions corresponding to the identifier positions within the block or record to be located. Unused memory positions must be space-filled. The identifier may be any number of characters from one to eighty. (2) The control panel switches 23–26, FIGURE 2, are respectively set to FORMAT, ENTRY, OFF and AUTO DUP & SKIP to condition the machine for search mode. (3) The keyboard release key is depressed for approximately one second. This causes data blocks to be read successively from tape and compared with the identifier in memory. When a match is found the tape reading will stop with the tape positioned at the inter-record gap just past the matched record.

The tape block identifier may be a series of numeric or alphabetical characters, or a combination of both. As an example, if the operator left off the day before with an account number located in memory positions 37–42, this account number would be the tape block identifier. Therefore, with the machine in entry mode, the operator would space fill memory up through location 36, then key in the identifier and then space fill from memory location 43 to the end of the record. The operation of the machine is exactly as described above in connection with the keyboard to memory portion of the entry mode, FIGURE 4.

Having entered the tape block identifier in the proper location in memory, the control panel switches are set as noted above and then the release key is depressed to start the tape read and compare portion of the search mode. Since the latter is essentially the same as the read after write portion of the tape cycle, FIGURE 7, the operation of the machine is basically the same and another flow chart is not needed for the disclosure. Instead, the operation of the machine in search mode can be described with reference to the simplified logic diagram of FIGURE 12.

Upon setting the control panel switches 23–26 as above described to condition the machine for the search mode, a barred search signal ($\overline{SEARCH}$)—which is one of the two inputs to an "or" gate 237, FIGURE 12—becomes false, removing the jam reset from the search control flip-flop 238. The $\overline{SEARCH}$ signal becomes false whereupon an unbarred search signal (SEARCH) becomes true, the latter being one of the two inputs to an "and" gate 239.

Upon depression of the release key by the operator, a signal designated the SPRA line becomes true, this signal being one of the two inputs to an "or" gate 240 which provides the input to a filter network 242. When the SPRA line becomes true, it generates a keyboard sprocket (K/SPR) signal, referred to hereinbefore, whereby a true signal is applied to a two input "and" gate 243. As shown in the logic diagram, one of these inputs passes through a delay network 244 such that upon expiration of a .4 second delay, both inputs to gate 243 are permissive and its output becomes true making gate 239 active in conjunction with the already true SEARCH signal.

The true output of gate 239 provides a permissive input to the "or" gate 237 whereupon the latter supplies a reset signal to the search control flip-flop 238. At the same time, the output of gate 239 sets the RUN flip-flop causing the tape cycle (TCY) signal to be activated. When the operator releases the release key, the K/SPR signal is rendered inactive and the clock is started thus initiating tape movement. As each character is received from tape, the corresponding TSPR1 provides a true input for an "and" gate 245, and as each character is read from tape it is compared against the character in the corresponding position of memory. Any discrepancy between the two provides a permissive input to gate 245 which goes active and causes the search control flip-flop 238 to set (S).

If the search control flip-flop is set at the end of the tape cycle (the latter being indicated by the symbol TCY), a two input "and" gate 246 becomes active and its output, acting through the "or" gate 240, causes K/SPR to become active. After a nominal .2 second delay (only the initial delay is .4 second), gate 243 again becomes active which causes the output of gate 239 to become active. This in turn renders the output of gate 237 active causing the search control flip-flop 238 to be reset.

The activation of gate 239 again sets the RUN flip-flop and this initiates a second tape cycle whereby the "and" gate 246, with no active input, is rendered inactive. This in turn causes K/SPR to become inactive with the result that the clock is again started thereby initiating tape movement and the read and comparison of the characters in the tape record. The cycle of operations described thus repeats itself until the record that is sought is located by virtue of the tape read occurring with all specified characters being in agreement. Thus, at the end of the tape cycle, flip-flop 238 will be in a reset state. With the flip-flop 238 in the reset state, the tape reading will stop with the tape positioned at the inter-record gap following the matched record.

KEYBOARD OPERATING FEATURES

An important feature of the machine which relates to the keyboard is the provision of a unique audible action and alarm circuit that causes a simulated clicking sound upon the depression of the keys and a steady tone in the event of an error. In key operated mechanical and electro-mechanical devices, a feed back relation exists between the machine and operator which is due in a large measure to the machine noise that is directly or indirectly caused by the actuation of a key. This feed back relation is essential in establishing a smooth operator cadence. In key operated electronic devices, mechanical actuation noises may be completely absent and it has been found that when this is the case key actuation noise must be supplied by artificial means for successful operation of the device. Further, it has been found that the artificial sound must closely simulate the normally encountered mechanical sound to which the operator is accustomed.

Another part of the feed back relation that is very important is the notice of an incorrect key depression that may be given to the operator. Thus, in conventional mechanical and electro-mechanical keyed devices the feed back may be due to a mechanical interlocking of the keyboard which then prevents subsequent key depression. This does not lend itself to electronic devices in that there are no mutual mechanical connections between the individual keys.

In the data recorder of the invention, both feed back requirements, i.e., an audible action response and an error alarm, are provided in a common electronic circuit. The actuating sound of a mechanical or electro-mechanical device can best be described as a "click." A very straight forward means for providing this sound would be the actuation of an electromagnet to provide a mechanical impact similar to that which would be encountered in a mechanical device. However, the response time of such a device is relatively slow compared to the potential operating speeds of the keyboard. It has the further disadvantage of a relatively high peak power requirement. The generation of a click sound by conventional acoustic techniques such as a speaker presents problems in that a click is a very low frequency sound and the efficiency of an economical speaker falls off drastically at these low frequencies. The system employed in the invention circumvents this problem by driving a speaker with a burst frequency which is within the efficient range of the speaker but sounds to a human ear as a click. The same circuitry, including the speaker, is then used as an error alarm by energizing it continuously which the ear receives as a high frequency tone.

The operation of this circuit, accordingly, is arranged so that the depression of a key enables the driving oscillator for a short period sufficient to create the click sound, and if the key deperssion is erroneous the driving oscillator is simply held on until the operator responds to the error condition. The circuit is disclosed in FIGURE 13 and can be generally classified as an oscillator. Forming a part of the oscillator is a permanent magnet speaker 248 connected in parallel with a 2.2K resistor 249. The speaker transforms electrical energy into acoustical energy and provides an inductance necessary for the operation of the oscillator.

In the quiescent state, the inputs at terminals 250 and 252 are at a negative potential of a nominal 10 volts. With terminal 250 at −10 volts, transistor 253 is in a conducting state by virtue of base current from resistors 254 and 255. With transistor 253 conductive, its collector potential is close to ground potential and capacitor 256 is essentially discharged; also, current is not available to the emitter of transistor 257 and consequently not to the base of transistor 258. The latter two transistors are thus both non-conductive.

With terminal 252 still at a nominal potential of −10 volts and transistors 257 and 258 non-conductive, the collector of transistor 258 and base of transistor 257 are at a nominal negative potential of 15 volts as determined by the ratio of:

$$\frac{R259\ (R260+R262)}{R259+R260+R262}$$

The resistor 263 provides a path for possible collector to base leakage current in transistor 258 thus precluding thermal instability. With the terminal 250 at a nominal potential of −10 volts, capacitor 264 is charged to a nominal 10 volts.

When a key is depressed generating a keyboard sprocket (K/SPR) signal, it causes the input at terminal 250 to be switched from its quiescent level of −10 volts to essentially ground potential. This positive transition is coupled via capacitor 264 to the base of transistor 253 causing it to turn off. Transistor 253 will then remain off until capacitor 264 discharges to a particular value or terminal 250 is switched back to its quiescent potential of −10 volts, whichever occurs first. When transistor 253 turns off, the current through resistor 265 now causes capacitor 256 to charge toward a potential of −30 volts. However, when this capacitor charges to a potential more negative than the quiescent potential at the base of transistor 257, the latter becomes forward biased and conductive, diverting current to the base of transistor 258 making it conductive.

The drop in the collector potential of transistor 258 increases the forward bias of transistor 257 which increases the current to transistor 258 and thus establishes positive feed back. As a result transistors 257 and 258 rapidly enter heavy saturation and the emitter of transistor 257 assumes a potential near ground. Capacitor 256 then discharges through the speaker coil producing acoustical energy i.e., the burst frequency previously referred to. Capacitor 256 and the inductance of the speaker now act as a resonant circuit in series with the emitter of transistor 257 with the result that when the charge on capacitor 256 is equal to the voltage drop between the collector and emitter (VCE) of transistor 257 plus the voltage drop between the emitter and base (VEB) of transistor 258, the inductor rings thus driving the emitter of transistor 257 positive with respect to its base whereby the transistor turns off.

When transistor 257 turns off, the base of transistor 258 is reverse biased and it also turns off with the result that its collector potential falls toward its quiescent value of −15 volts. This feed back action again results in a rapid transition from the conducting to non-conducting state of transistors 257 and 258. With transistors 257 and 258 non-conducting, capacitor 256 again charges toward −30 volts and a new cycle is initiated. This operation continues until transistor 253 again becomes conductive at which time the oscillator circuit assumes its quiescent state.

The discharge period of capacitor 256 is approximately $$\frac{1}{4\pi\sqrt{LC}}$$

and the charge period is approximately:

$$\frac{R259}{R260+R259+R262}=\epsilon^{-\frac{t}{C256 \cdot R265}}$$

where $\epsilon$ equals the natural log base and $t$ equals time.

The power input to the speaker per cycle is approximately:

$$P=\tfrac{1}{2}C256\left[\frac{30R259(R260+R262)}{R260+R259+R262}\right]^2$$

To generate a steady tone for the error alarm, terminal 252 is switched from its quiescent state of −10 volts to ground, this transition being caused by the setting of the keyboard lockout flip-flop. This causes transistor 253 to turn off and effectively shunts resistor 262 to ground potential. The operation of the circuit is now identical to that of the burst operation except that the trigger point of transistor 257 is lowered. This results in a shorter charge period for the timing capacitor 256 and less energy input to the speaker coil, thus decreasing the loudness of the error tone in relation to the peak level of the burst.

Another important feature of the machine having to do with keyboard operation is the manner in which a keyboard sprocket is generated, including an automatic repeat operation which enables repetitive entry of a character if the key for that character is held depressed. By generation of a keyboard sprocket is meant the generation and synchronization of signals noting that a contact closure within the keyboard has occurred. The means by which the machine is permitted to function in this manner is disclosed in the circuit of FIGURE 14.

In FIGURE 14, the function of transistors 267, 268 and 269 and their associated components is to provide a spike free signal at output terminal 270 in response to input terminal 272 being switched from a low to a high state by the actuation of the keyboard switch. The necessity for the circuit stems from the properties of a mechanical switch which causes an intermittent connection during the immediate periods of closure and break of the switch contacts. This characteristic is commonly referred to as switch bounce. To provide for proper synchronization of the logic circuits which must respond to the switch operation when a key is depressed, it is mandatory that a logic signal be derived which is free of any spikes.

In the quiescent state, the inputs to the cathodes of diodes 273, 274 and 275 are at a nominal ground potential. The input to the cathode of diode 276 is at a nominal potential of −10 volts, thus supplying current via resistor 277 to the base of transistor 267 causing it to be in a conductive state with its collector potential at essentially ground potential. With the collector of transistor 267 at ground potential, capacitor 278 is discharged and transistors 268 and 269 are in a non-conductive state. The collector of transistor 269 is at a nominal potential of −12 volts, said potential being established by the divider action of resistors 279 and 280. With the collector potential of transistor 269 at the nominal −12 volt level, transistor 268 is heavily back biased as is diode 282. With diode 282 back biased, capacitor 283 is charged to a nominal 10 volts via resistor 284 in the base-emitter junction of transistor 267.

Upon actuation of a keyboard switch, the input to diode 276 switches from its quiescent potential of −10 volts to a nominal ground potential. During the first few milliseconds of the switch actuation, the input to the diode will be in an ambiguous state. That is to say that switch bounce may occur during the first few milliseconds of closure causing the input to diode 276 to switch intermittently between −10 and ground before eventually assuming a rest potential of ground. During the time that the input of diode 276 is at ground potential, transistor 267 will turn off and capacitor 278 will charge toward −10 volts via resistor 285.

During the bounce period, any time that the input to diode 276 reverts to the −10 volt potential, transistor 267 will again assume a conducting state and discharge capacitor 278. Thus, at the end of each bounce interval, the potential at the collector of transistor 267 is returned to ground potential. When the switch bounce ceases, the input to diode 276 remains at ground potential long enough for capacitor 278 to charge to the same potential as the collector of transistor 269, and transistor 268 will become forward biased supplying base current to transistor 269 the collector potential of which will rise towards ground increasing the base-emitted drive of transistor 268. This establishes a condition of heavy feed back between transistors 268 and 269 with the result that the collector of the latter switches rapidly from its rest potential of a nominal −12 volts to ground.

When the collector of transistor 269 switches to ground, diode 282 becomes forward biased and its cathode is switched to essentially ground potential. With the cathode of diode 282 at ground potential, capacitor 283 is now effectively connected across the emitter-base junction of transistor 267. The input to this transistor will now be integrated by the RC time constant of resistor 277 and capacitor 283. Thus, during the opening of the switch contacts, the intermittency of the signal at the input of diode 276 will not affect transistor 267 until the signal has gone back to the negative potential of −10 volts for a sufficient period of time to charge capacitor 283 to the point where transistor 267 again becomes forward biased. When this occurs and transistor 267 becomes conductive, the emitter current for transistor 268 and the corresponding base current for transistor 269 are diverted through the collector of transistor 267, and transistors 268 and 269 revert to their non-conducting state.

The circuit of FIGURE 14 thus has a bi-directional hysteresis property. That is to say, prior to closure of a switch contact with transistors 268 and 269 off, transitions on the input line from −10 volts to ground are effectively integrated and the integrator is rapidly restored for any transition from ground to −10 volts. However, once the circuit has switched to its active state, input transitions from ground to −10 volts are integrated. Further, the speed of transition at the collector of transistor 269 is essentially independent of the integrator periods due to high feed back conditions during the transition intervals. The turn on integrator, comprised of resistor 285 and capacitor 278, has a longer period than the turn off integrator, comprised essentially of resistors 286 and 277 and capacitor 283, in that the bounce interval of a contact closure is considerably longer than the bounce interval of a contact break.

The automatic repeat function is provided for by transistors 287 and 288 and associated components. In their normal state transistors 287 and 288 are both conducting. When the collector of transistor 269 switches to its active state of ground potential, the base of transistor 287 is driven to a nominal potential of +10 volts. Thus, it becomes non-conductive and its collector resistor 289 then supplies drive current to the base of transistor 288 via resistor 280. If the collector of transistor 269 remains high for a period exceeding approximately .4 of a second, capacitor 290 will discharge to the point where transistor 287 again becomes conductive diverting the current from resistor 289, thus removing the base current to transistor 288 whereby the latter becomes non-conductive. With transistor 288 non-conductive, the input to diode 275 switches to a nominal potential of −10 volts thus providing the equivalent of a contact opening.

With the common point of diodes 273, 274, 275 and 276 at a nominal potential of −10 volts, capacitor 283 charges until transistor 267 becomes conductive causing transistors 268 and 269 to become non-conductive. In addition, the collector potential of transistor 269 reverts to its quiescent potential of −12 volts and transistor 288 again becomes conductive. Thus, an oscillatory action is established. During the first interval, capacitor 290 would have been fully charged to a potentail of −10 volts, thus giving the aforementioned .4 second "off" interval for transistor 287. During the ensuing off interval of transistor 269, capacitor 290 cannot fully recover before transistor 269 again switches to its active state. Thus, the subsequent off intervals of transistor 287 will be but a fraction of the initial interval. The result is that if a switch is held depressed for a period exceeding .4 second, the output at 270 automatically switches to the inactive state causing the acceptance of the key action, and then K/SPR again goes active and the cycle repeats until the switch is released.

TAPE ERRORS

One of the features of the data recorder of the invention is the means by which, on tape read, the operator receives the same error indication and can follow the same corrective procedure regardless of whether the error is caused by blank tape, bad spots on the tape or actual error conditions in a written record. This means includes a timed pinch roll drive circuit and a system for generating artificial tape sprockets in the tape sprocket circuit. The timing in the pinch roll drive circuit is such that the pinch roll 39, FIGURE 1, is moved into engagement with the capstan 38 only long enough to move the tape forward for a maximum of approximately 3.5" after which the tape stops and remains stationary until another 3.5" maximum increment of forward movement is initiated by a release operation as previously described.

Before describing the system for generating artificial tape sprockets or drive signals, it should be explained that the tape motion control flip-flops are normally reset by a sequence which depends on reading tape sprockets, it being necessary to have 81 such sprockets per record in order to complete a tape cycle. Normally, a "1" bit in any channel of a data character frame on tape will produce a tape sprocket, and a sprocket produced in this manner will hereinafter be referred to as a normal tape sprocket. In the artificial sprocket generating system, means are provided so that if a normal sprocket does not appear within 900 microseconds after the last sprocket was read, an artificial sprocket will be generated. For the generation to occur, however, there must be at least one input sprocket.

If the machine attempts to read blank tape, as for example the first part of a tape that has been put in the data recorder to be verified, the tape may move forward 3.5" and stop without there being any normal tape sprockets for the machine to read. In such case, a trailing edge differentiator in the pinch roll drive circuit forces an input into the read amplifiers which causes a tape sprocket to be produced. This initial tape sprocket activates the artificial sprocket generating system since a normal sprocket will not be encountered in the ensuing 900 microseconds. Therefore, the system generates an artificial sprocket and this will continue until a total of 81 sprockets have been read. The generation of the sprockets in this manner completes the tape cycle but results in a parity error and the error condition is indicated to the operator by the machine.

The error condition will be indicated by the control panel lights 29, FIGURE 2. Thus, the normally lighted READY light will be extinguished and the release lockout (REL L/O) will be lighted together with one or both of the other two lights. When the operator sees this error indication she always follows the same procedure which is to backspace and release. Backspacing is accomplished by depressing the tape backspace (TBS) key while holding the error release (ER) key depressed and results in the tape being moved back approximately 1.125″. Thereafter, the release (REL) key is depressed which causes the tape to move forward for another increment of up to 3.5″ while its contents, if any, are sensed by the read head 18.

Moving the tape forward another increment will probably bring a record into position so that it can be read in the usual way without an error condition. If, on the other hand, the tape continues to be blank throughout the full 3.5″ of possible movement, the pinch roll circuit will again initiate the generation of artifiicial tape sprockets as above described. Another possibility is that the forward movement of the tape will terminate while a record is being read. In such case, even though no further normal tape sprockets appear, an artificial sprocket will be generated 900 microseconds after the last normal sprocket and this process will continue until the tape cycle has been completed.

Completion of the tape cycle by the generation of artificial tape sprockets will result in an error condition that will be indicated to the operator in the manner described just above. The operator will, therefore, backspace and release which will insure that the entire record will be read on the next forward movement of the tape.

If the tape being read contains previously encountered and erased bad spots whereby the tape movement terminates before reaching a record or in the midst of reading a record, the operation of the machine, the error indication and the procedure followed by the operator will be exactly the same as in the case of blank tape. On the other hand, if the tape bad spot occurs in the middle of a record that is being read on a read after write check, for example, the bad spot could cause either a non-compare or a parity error or both. In such case, the error indicated will be the same as previously described but because the bad spot is in the middle of an otherwise properly recorded record, a backspace and release by the operator will only result in the same record being read again with another error indication.

After this has happened several times with an error, indication each time, the operator will follow a modified procedure consisting of backspacing, depressing the tape erase forward (TEF) key and thereafter the release (REL) key. The backspace will move the tape back 1.125″ but the tape erase forward will move the tape forward approximately 3.5″ erasing the error record and positioning the tape for rewriting the block at a new location. Accordingly, when the release key is depressed the contents of memory will again be written as a data record in the new tape location and thereafter will again be automatically checked.

Another situation in which the system for generating artificial tape sprockets is utilized is that in which a record has no 1 bits in its longitudinal parity frame. In reading such a record, there would not be a normal 81st tape sprocket and therefore the tape cycle could not be completed. Moreover, without the 81st tape sprocket, the machine could not check for correct longitudinal parity. In a situation of this kind, the lack of a normal tape sprocket after the 80th tape sprocket would result in the generation of an artificial tape sprocket after 900 microseconds and this would then permit completion of the tape cycle in the normal manner.

The operation of the timed pinch roll drive circuit that controls the forward movement of the tape is described with reference to the simplified logic diagram of FIGURE 15. The drive circuit is activated by the move tape signal which occurs by reason of the TCY signal being active while the backspace delay flop (BSDF) is in a reset state. When a move tape signal occurs, the leading edge is differentiated by differentiator 292 which sets a 110 millisecond "one shot" delay flop 293. Setting the delay flop 293 causes pinch roll 39, FIGURES 1 and 20, to engage capstan 38 and move the tape forward.

In the absence of another signal, the pinch roll will remain engaged with the capstan for 110 milli-seconds and cause the tape to move forward approximately 3.5″, the distance being governed by the design of the tape tension arm, to be described, as well as the time factor. At the end of 110 milli-seconds, the one shot delay flop automatically resets causing disengagement of the pinch roll.

In a normal tape read, without an error condition, the duration of the move tape signal will be far less than 110 milli-seconds and its trailing edge will be differentiated by differentiator 294 which forces the delay flop 293 to reset short of its own delay period. The pinch roll is thus caused to disengage, usually after moving the tape approximately 1.125″. It will be understood, therefore, that the one shot delay flop provides an emergency shut off for the error conditions described just above when there is nothing on the tape to cause normal termination of the move tape signal. Such an emergency shut off is highly desirable because it prevents run-away and the resultant complications when error conditions do occur.

Forming a part of the pinch roll drive circuit is a differentiator 295 which forces an input signal into the read amplifiers upon differentiating the trailing edge of the pinch roll drive signal. The function of this signal will be described in more detail in connection with the circuit for generating artificial tape sprockets.

The tape sprocket circuit, including path for generating and regenerating artificial tape sprockets, is shown diagrammatically in FIGURE 16. In a normal tape read, data on the tape is sensed by the read head 296 and fed into the read amplifiers indicated at 297. As described above in connection with the tape cycle portion of the entry mode, when the first bit in each frame is read from tape and transferred to the B register it also causes the generation of a TINFO signal which, after the de-skew delay period, initiates normal tape sprockets. What happens to the tape data after being transferred to the B register is shown in FIGURE 9; the TINFO signal that is generated goes from the output of the read amplifiers to one of the two inputs of an "or" gate 298. The output of gate 298 passes through a network 299 which causes the de-skew delay, and at the end of the delay period tape sprockets are initiated.

If, as described above, the forward movement of the tape should terminate while a record is being read, no further normal tape sprockets will appear at the output point 300 of the tape sprocket circuit. When this happens, a second delay network 301 will generate a signal 900 microseconds after the last normal sprocket. The signal from the network 301 is one of the two inputs to an "and" gate 302, the output of which becomes true by reason of the read gate being active. The latter is still active, even though the tape has come to a stop, because 81 TINFO signals have not been produced. The output of gate 302 provides a permissive input for the "or" gate 298 whereby an artificial tape sprocket is generated. This process will continue until the tape cycle has been completed.

If the tape is completely blank so that there are no natural tape sprockets at all, when the pinch roll drive stops the differentiator 295 will force a signal into each of the read amplifiers and the output generates a TINFO signal which is fed into gate 298 so that tape sprockets are initiated as above described. The TINFO signal that is created by the trailing edge of the pinch roll one shot 293 is not effective in the normal case because it occurs after the read gate becomes inactive. After a TINFO has been produced by differentiator 295, repetitive tape sprockets will thereafter be generated at 900 microsecond intervals until the tape cycle has been completed.

LEFT ZERO OPERATION

The purpose of the left zero feature of the invention is to obviate the requirement for the operator to key in preceding zeroes or spaces for right justified data fields. While the principal application of such a feature is for the entry of variable amount money fields, it is just as usable in fields containing mixed alpha/numeric data. There are no limits to the length or position of a left zero field other than that it must stay within the 80 character record. A left zero field must be identified by the proper program code in its most significant digit (MSD) position, and the location following the least significant digit position must also contain a most significant digit code.

During entry mode, the operator keys in the characters to be left zeroed beginning at the most significant digit position of the left zero field. Following the entry of the least significant digit, the left zero key is depressed and the left zero control circuitry causes all of the characters that were entered in the field to be right shifted until the last character is positioned in the least significant digit position with the unused most significant positions filled with zeroes. In the event that the number of digits entered by the operator is equal to the field length, the depression of the left zero key will occur in the most significant digit position of the following field and the machine will not perform the left zero operation as will be explained presently.

When the machine is in the verify mode, the left zero feature is used to by-pass preceding zeroes in a field containing right based information, i.e., a field that was left zeroed during entry mode. This is accomplished by automatically by-passing all locations containing a zero code upon depression of the left zero key.

A left zero operation in entry mode is diagrammatically illustrated by the flow chart of FIGURE 17 (composed of Parts 1 and 2), by the FIGURE 18 block diagram illustrating the data travel routes, and by the simplified left zero field diagram of FIGURE 19. In the latter, the left zero field occupies memory positions 37–42, with position 37 being the most significant digit position. The field is identified in this position by a program code indicated by the number 2. Similarly, the most significant digit position of the following field (memory position 43) is also identified by the same program code.

Referring now to FIGURE 17, Part 1, the left zero operation is initiated by keying in the characters to be left zeroed, for example, the numbers 3–8–7 as shown in FIGURE 19. The left zero key is then depressed as indicated by block 304, and this causes the left zero A (LZA), the left zero B (LZB) and the function (FUN) flip-flops to be set, block 305. Releasing the key generates a keyboard sprocket (K/SPR) which starts the cycling unit.

The purpose of the LZA flip-flop is to enable the unused portion of the left zero field to be initially filled with blanks, as shown in positions 40–42 in FIGURE 19. The LZB flip-flop, when set, causes the memory advance (MADV) flip-flop to be jammed in the set state; the cycling unit will, therefore, continue to operate as long as the LZB flip flop remains set. The function flip-flop is set to provide one dummy memory cycle whereby program bits can be checked to determine whether or not depression of the left zero key has occurred in a most significant digit position. Thus, following the usual preliminary cycling unit operations indicated in line (1) of FIGURE 17, the machine must determine at diamond 306 if key depression has occurred at a memory position containing an LZB program code. If the answer is YES, the LZA and LZB flip-flops are reset and the left zero operation does not take place, the ensuing machine operations being as indicated in line (4) to be described.

If the answer to the question of diamond 306 is NO, the data that was transferred from memory to the A register at TP2 is returned to memory, and at TP6 the attempt to advance to the next location of memory is blocked by the FUN flip-flop, block 307. At TP7, the indicated transfer of data from the A to the B register has no meaning at this point. However, even though the LZB flip-flop is jamming the MADV flip-flop in the set state, the TP7 pulse will override the jam condition long enough to permit the MADV flip-flop to reset the FUN flip-flop, see block 308. Thereafter, the sequence of operations continues with another memory cycle in which the same memory location is again accessed and its contents transferred to the A register, block 309.

The next operation is a question at diamond 310 which is whether, with the LZB flip-flop still set, the accessed memory location is the MSD position of a data field. If the answer is NO, another question is asked which is whether the contents of the A and B registers are the same, diamond 312. If they are the same, the equal (EQ) flip-flop is set; otherwise the flip-flop is reset. In either case, the next thing that happens is the clearing of the B register to all binary zeroes by the LZA flip-flop, and the transfer of the B register contents to memory (BTM), see block 313. This results in the accessed memory location having its previous contents replaced with a blank as is shown in position 40 of FIGURE 19. Following this, memory is advanced to its next location, the B register is cleared and then at TP7 the contents of the A register (received from the previously accessed memory location) are transferred to the B register.

The setting of TP7 initiates a new memory cycle indicated by the operations following the figurative junction point B1 in line (2) of FIGURE 17. Thus, until the MSD position of the next data field is encountered the machine will continue to fill the successive memory locations with blanks, see block 313. When an MSD position is encountered (as at position 43 in FIGURE 19), the answer to the question of diamond 310 will be YES which will cause the memory backspace (MBS) flip-flop to be set, block 314. Thereafter, the machine must determine whether or not the LZA is set, diamond 315. Since, at this point in the left zero operation, the LZA flip-flop is still set, the next operation is to reset it, as indicated by block 316. At the same time, the contents of the A register are returned to memory so that the contents of the MSD position of the subsequent field are not modified.

After the LZA flip-flop has been reset, there is a unit step (U.S.) backward, block 317, whereby the preceding location of memory is accessed (position 42 in FIGURE 19). Following the unit step, another memory cycle is initiated as indicated by blocks 318–326 lines (3) and (5) of FIGURE 17. In the course of the cycle, the contents of the accessed memory location are transferred to the A register at TP2 and then, if it is determined from the program bits that the location is not an MDS position (diamond 322), the contents are returned to memory at TP5. Thereafter, there is a unit step backward and another memory cycle is initiated. In this manner, the memory counter is reduced by one during each memory cycle whereby the memory positions in the left zero field are accessed in reverse order, without modifying the contents thereof, until the MSD of the left zero field is encountered. This sequence of operations can also be described with reference to FIGURE 19 by saying that the memory positions in line (a) are accessed in reverse order from position 42 back to position 37, the MSD position, without in any way altering the memory contents that are indicated for this particular line.

When the MSD position of the left zero field is encountered with the LZB and MBS flip-flops still set, the answer to the question of diamond 322 will be YES which will cause the MBS flip-flop to be reset, block 327. With the MBS flip-flop reset in conjunction with an MSD position being indicated by program memory, the B register is jammed to decimal zero, see block 328 and lower part of FIGURE 18, and then the contents of the B register are transferred to memory, block 329. This places a zero in the MSD position of the left zero field as indicated in line (b) of the FIGURE 19 diagram. Thereafter, the B register is cleared and memory is advanced to its next location moving once again in the forward or left to right direction as viewed in FIGURE 19.

Following the unit step at block 330, the contents of the A register—which were received from the previously accessed memory position, i.e., the MSD position of the left zero field—are transferred to the B register, block 332. This occurs at TP7 and thereafter another memory cycle is initiated which is indicated by the blocks following the junction point B1 in line (2). In the new memory cycle, the contents of memory are transferred to the A register at TP2, the contents of the B register are transferred to memory at TP5 and the contents of the A register are transferred to the B register at TP7, see FIGURE 18. At the end of the cycle, therefore, the memory contents are those that the B register received via the A register from the previous memory position during the preceding cycle, and the contents of the B register are what it received via the A register from the current memory position. As indicated also, memory is advanced to its next location at TP6, and following TP7 the cycle is repeated with the same operations for the new location of memory.

The cycle from point B1 to the end of line (2) of FIGURE 17 is thus one that recurs until the MSD position of the next data field is encountered at which time the contents of the successive memory locations will be shown in line (b) of FIGURE 19. The result is that on each forward pass through the left zero field, the contents of the field are shifted to the right by one memory position. It should be noted that in these recurring cycles the clearing of the B register to binary zeroes as called for in block 313 does not occur because the LZA flip-flop was reset at block 316 after the unused right hand positions of the left zero field were initially filled with blanks.

Still referring to the recurring cycles described above, it should also be noted that the question of diamond 312, which is a comparison at TP5 of the contents of the A and B registers, may have a NO answer for cycles in memory locations to the left of the least significant digit position but that this will not affect the operation of the machine. On the other hand, when the least significant digit position of the left zero field is accessed (position 42 in FIGURE 19), the answer will be YES as long as there is a blank in the least significant position. Thus, both the A register having the contents of the current memory location and the B register having the contents of the previous memory location will contain blanks (see, for example, lines (b) and (c) of FIGURE 19).

With the contents of the A and B registers being the same in the least significant digit position of the left zero field, the equal flip-flop will be set. On the next cycle, when the accessed memory location is the MSD of the subsequent data field, the answer to diamond 310 will be YES causing the MBS flip-flop to set. Following this, the answer to diamond 315 is now NO so that the question of diamond 333 must be asked and its answer, as noted just above, will be YES. This will set in motion another reverse pass through the machine whereby the memory positions are accessed in reverse order without modifying their contents as is indicated by the recurring cycles of line (5) of FIGURE 17, previously described.

When the machine again reaches the MSD of the left zero field (position 37 of FIGURE 19), the MBS flip-flop is reset, a decimal zero is entered into memory and another forward pass is initiated through the left zero field. See blocks 327–332 of FIGURE 17 and line (c) of FIGURE 19. During this pass, the contents of the field are again shifted to the right by one memory position.

When, at the end of a forward pass through the left zero field, the least significant digit of the characters that were keyed into the machine is transferred into the least significant digit position of the left zero field (see position 42, line (d) of FIGURE 19), the A register at TP5 will contain a blank but the B register will contain the code for the least significant digit. Accordingly, the answer to diamond 312 will be NO and the equal flip-flop will be reset, block 334. On the next cycle, therefore, the sequence of operations will lead from diamond 310 through diamond 315 to diamond 333 where the answer will now be NO.

A NO answer at diamond 333 will cause the LZB flip-flop to be reset, block 335, and the trailing edge of this flip-flop will set the function flip-flop and reset the MBS flip-flop, blocks 336 and 337. The MBS flip-flop was set at block 314 following the detection of the MSD at diamond 310. The setting of the function flip-flop is necessary in that the MSD position (of the next data field) that ends the left zero operation may be programmed for a skip or duplication operation. Accordingly, the function flip-flop blocks the advance of memory to its next location, block 338, and the memory cycle in the MSD position is reset so that the machine can determine, by the means indicated in line (2) of FIGURE 4, whether an automatic skip or duplication operation should be initiated. The left zero operation, therefore, does not terminate until after TP3 of this memory cycle.

TAPE MOVEMENT MECHANISMS

The mechanical structure associated with the movement of the tape is disclosed in FIGURES 1 and 20–27, inclusive. As already noted in the section entitled "TAPE," the tape path leads from a reel 16 around a fixed guide roller 34, tension arm guide roller 35 and then between the rollers 36 of a backspace mechanism, see FIGURES 1 and 20. From the latter, the tape passes through a pressure pad mechanism 37, under erase head 17 and read-record head 18, and then between capstan 38 and pinch roll 39. Thereafter, the tape drops straight down into a storage bin, not shown, located in an enclosed portion 19 of desk 11.

The tape reel is removably mounted on a circular holder 340, FIGURES 1, 20 and 22. As may be seen in FIGURE 22, where the reel itself is not shown, the holder is comprised of a backing plate 342, a locking plate 343 and a band 344 of resilient material such as rubber which engages the edges of the two plates as shown. The edge of the locking plate tapers outwardly and at its point 345 of maximum diameter, with the band 344 encircling it, it is slightly larger than the center opening of a standard reel. The locking plate is movable axially on shaft 346 and when it is pulled outwardly by means of knob 347, compressing an interior spring 348, its outer edge 345 moves away from the outer edge of the band 344 so that the latter can contract to an overall diameter that is slightly less than that of the plate outer edge. This enables the tape reel to be slipped past the plate edge 345 and onto the holder where it will be held in place by permitting the locking plate to return to its inner position shown in FIGURE 22.

Locking plate 343 is provided with pins 349 which are normally received with a free fit in corresponding holes in backing plate 342. The length of these pins is such that when the locking plate is pulled out to mount or demount a reel, the pins are completely withdrawn from the holes and the plate can be turned slightly to move the holes and pins out of registry whereby the pins hold the plate in the outer position.

The shaft 346 turns freely with the reel holder when the tape is being drawn off the reel and operates as a drive shaft when rewinding. The shaft extends through the tape deck wall 350, and on the back side thereof it is supported by a bearing housing 352 that is secured in spaced relation to the wall by a plurality of posts 353. A motor 354 for rewinding the tape is mounted on a bracket 355, the bracket being connected to the bearing housing by standoff posts 356. The motor is provided with a clutch 357 and its shaft 358 is connected to shaft 346 by a torque converter spring 359.

A brake drum 360 is fixed on shaft 346 just behind the wall 350 and a brake band 361, having a looped end 362 mounted on one of the posts 353, passes partially around the drum. The free end 363 of the band is connected through a tension spring 364, FIGURE 21, to the extension arm 365. A spring finger 366, supported by a bracket 366a mounted on a post 353, bears against the free end of the brake band as shown so that the band maintains engagement with the brake drum even when the upper end of the tension arm moves toward the right as viewed in FIGURE 21. The tension arm is pivotally connected to the tape deck wall at 367 and its upper end extends through a slot 368 in the wall and carries the tape guide roller 35. As best shown in FIGURE 22, roller 35 has an hour glass configuration whereby the tape is self-centering with respect to it.

A second tension spring 369 extends from the tension arm to a post 370 and biases the upper end of the arm toward the left as viewed in FIGURE 21. This cooperates with the brake band 361 to keep the proper amount of tension on the tape at all times as it is being drawn off the reel. Thus, if the pull on the tape at capstan 38 starts to become excessive, this will cause roller 35 to move toward the right (FIGURE 21) thereby slackening the pull on the brake band so that the tape reel will turn more easily. Conversely, if the pull on the tape is relatively light, spring 369 will have more effect and will cause roller 35 to move toward the left; this tightens the brake band on the brake drum so that the tape reel turns less easily.

The tape is unwound or drawn from the reel by moving the pinch roll 39 into engagement with the rotating capstan 38 with the tape positioned therebetween. The capstan rotates continuously while the machine is on, and it is driven by a motor 372 mounted on the back of the tape deck wall 350 by means of a bracket 373, FIGURE 21. The motor shaft carries a pulley (not shown) that drives a timing belt 374 and the latter drives a back-space mechanism pulley 375 and a capstan pulley 376, see FIGURE 23. The capstan pulley is fixed on a shaft 377 that is journalled in a bearing block 378 forming a part of the capstan sub-assembly shown in FIGURE 23.

The block 378 is carried by a head plate 379 that is mounted in an opening in the tape deck wall 350, FIGURES 20 and 21, and shaft 377 carries capstan 38 on the front side of the head plate. Behind pulley 376, shaft 377 carries a flywheel 380 which is provided to dampen any motor jitter there might be. The flywheel also enables immediate response to the pinch roll action because its weight evens out the load.

Above the capstan, as shown in FIGURES 20 and 23, are two fixed tape guides 382 which hold the tape in engagement with the erase and read-record heads 17, 18. A spring steel finger 383 bears against the left hand guide to minimize the possibility of having a tape loop form between the read-record head and capstan. This finger can be moved out of engagement with the guide when threading the tape.

The pinch roll 39 is rotatably mounted in a holder 384 that is fixed on a rocker shaft 385, the shaft passing through the head plate 379 and being journalled in a bearing block 386 mounted on the back of the plate. An upstanding rocker arm 387, FIGURES 23 and 24, is fixed on the rocker shaft in a bifurcated portion 388 of the bearing block, and this arm is engaged by the plunger 389 of a commercially available actuator 390 such as a Ledex actuator, a linear solenoid. A spring 392 extending from the top of arm 387 to a post 393 holds the pinch roll out of engagement with the capstan when forward movement of the tape is not called for. When forward movement is called for, a signal is received by the actuator which causes its plunger 389 to rock arm 387 in a clockwise direction (as viewed in FIGURE 24) and press the pinch roll into engagement with the capstan.

The backspace rollers 36, FIGURES 20 and 25, are arranged to move the tape backward a distance of 1.125" upon receipt of a signal, as previously described. To this end, the upper, drive roller 36a which is made of steel has a relieved area 394 whereby only 191° of the roller's surface can engage the tape. The lower roller 36b is made of urethane and is simply a follower. Roller 36a is fixed on a shaft 395 that is journalled in a bearing block 396 mounted on the back of the tape deck wall. The shaft extends back from the bearing block and into a spiral cam 397, FIGURES 25 and 26, forming a part of a commercially available wrap spring clutch. This clutch is operably connected on its opposite side to the backspace pulley 375 driven by motor 372, FIGURE 21.

Pulley 375 turns continuously as described above, and can be made to drive shaft 395 through a conventional wrap spring (not shown). However, the wrap spring is normally prevented from driving the shaft by cam 397 which is connected to one end of the spring. This is accomplished by preventing rotation of the cam through engagement of its shoulder 398 with a shoulder 399 on a rocker arm 400, FIGURE 26. The rocker arm, which is pivotally connected to the bearing block at 402, is normally biased into engagement with the cam shoulder by a spring 403.

The rocker arm can be moved out of engagement with the cam shoulder by a counter clockwise rotation of the arm, this being effected by a solenoid actuator 404 such as actuator 390 described above. To this end, the arm has a lower extension 405 provided with a horizontal flange 406 that underlies the actuator plunger 407. When the backspace signal is received by the actuator, its plunger moves downward just long enough to rock the rocker arm and permit cam 397 to be rotated by means of the wrap spring clutch.

Since the plunger is retracted almost immediately, the rocker arm is rotated in the opposite direction by spring 403 and its shoulder is in position to stop the cam after one complete revolution thereof. The roller 36a, therefore, also makes one complete revolution with its non-relieved surface portion engaging the tape long enough to backspace it the required distance. A tab limit stop device 408 is operably connected to an end of the wrap spring and coacts with the clutch mechanism in a well-known manner.

Located between the backspace rollers 36 and capstan 38 is the pressure mechanism, generally designated 37 in FIGURES 20 and 27. This mechanism is mounted on the front of the tape deck wall 350 and is provided to help maintain proper tension on the tape. To this end, the tape passes between a flat cork pad 409 and a flat steel plate 410 which are resiliently biased towards one another. The cork pad is biased upwardly by a spring (not shown) located between the pad and an underlying support shelf 412. The amount of downward pressure exerted by plate 410 can be regulated by means explained just below.

The plate 410 has a ball and socket connection with the lower end of a rod 413 which extends up through the pressure mechanism housing 414 and is connected at its upper end to an operating tab 415. The connection comprises a small pin 416 which passes through the rod normal to its axis so that the tab can be swung forwardly relative to the rod, or in the counter clockwise direction as viewed in FIGURE 27. The lower front edge 417 of the tab is formed with a radius which permits such movement, it being possible to move the tab to a position at right angles to the position shown in FIGURE 27. Since the pin 416 is located slightly closer to the back than to the front of the tab, movement into its extreme forward or right angle position causes the rod to be raised slightly so that the pressure between pad 409 and plate 410 is reduced. The raising of the rod compresses a spring (not shown) within the housing 414, and this spring urges the rod to return to its lower position as soon as movement of the tab towards its upright position is initiated.

During the normal forward and backward movement of the tape, tab 415 is positioned in its upright position whereby the maximum pressure that is provided for by the mechanism is exerted on the tape. When the tape is being rewound on the reel, however, less pressure is required and the tab is moved to its full forward or right angle position.

While the circuits and logic diagrams disclosed in the drawings show transistors as being of a specific PNP or NPN type, and also refer to various inputs and signals as switching from a low to a high state or vice versa, it will be understood that the polarity can be reversed in any circuit without making a material change in the arrangement or operation of the circuit.

From the foregoing description, it will be apparent that the data recorder of the invention provides a novel and highly useful machine that is capable of performing in a versatile yet very efficient manner. As will be understood by those familiar with the art, the invention may be embodied in other specific forms without departing from the spirit or essential characteristics thereof. The embodiment disclosed is, therefore, to be considered in all respects as illustrative rather than restrictive, the scope of the invention being indicated by the appended claims.

What is claimed is:

1. In a unitary machine for manually recording and verifying data on magnetic tape, said machine being capable of operating in either an entry or a verify mode: a keyboard, a magnetic core memory, a first and a second storage register, means operable when the machine is in entry mode to transfer a plurality of data characters keyed into the keyboard to said core memory, other means operable upon entry of a predetermined number of characters into said memory to transfer the data from said core memory to the magnetic tape to form a data block thereon, means operable when the machine is in verify mode to store a block of data previously recorded on tape in said core memory, other means operable in verify mode to transfer data keyed into the keyboard to said first storage register, other means operable in verify mode to transfer data stored in said core memory to said second storage register, and further means opeable in verify mode to compare the contents of said first and second registers.

2. A machine as defined in claim 1 including means for holding the tape stationary while a block of data is being transferred from said keyboard to the core memory, and means operable in entry mode for automatically initiating forward tape movement when a complete data block has been entered in memory whereby said transfer of the data from the memory to tape can accur.

3. A machine as defined in claim 2 including means for automatically backspacing the tape a predetermined distance upon completing said transfer of the data from the memory to tape, and means operable in entry mode for again initiating forward tape movement following said automatic backspacing whereby the data on the tape can be compared with the data that was entered in memory from said keyboard.

4. A machine as defined in claim 1 wherein the means that is operable in verify mode for storing data previously recorded on tape in said core memory causes a complete data block to be entered in memory, and said means for comparing the contents of said first and second registers in verify mode is actuated each time data is keyed into the keyboard.

5. A machine as defined in claim 1 wherein said magnetic core memory includes cores for storing data and cores for storing a program pattern, said program pattern cores being operable to initiate automatic operation of a plurality of different machine functions.

6. A machine as defined in claim 1 including means in entry mode for recording a vertical parity bit for each frame on tape, means in entry mode for recording a longitudinal parity bit for each tape channel after a complete block of data has been written on tape, and means in verify mode for checking the correctness of said vertical and longitudinal parity bits.

7. In a data recording machine of the character described including a magnetic core memory and record tape reading means, means for operating the machine in search mode comprising, a search control flip-flop jammed in a reset state when the machine is not in search mode, a first signal means operable when the machine is conditioned for search mode to remove the reset jam from said flip-flop, a second signal means to apply a reset signal to said flip-flop and to initiate a tape cycle in which tape is read by said tape reading means, means for comparing each character read from tape with the character in the corresponding position of memory, an "and" gate that is made active upon receipt of an enabling signal produced by a discrepancy between the tape and memory characters, the output of said "and" gate being operable to supply a set signal to said flip-flop, and means responsive at the end of a tape cycle to a set condition of said flip-flop to initiate another tape cycle, whereby said cycles are repeated until a tape cycle terminates with said flip-flop in a reset condition by reason of a complete agreement between the characters being compared.

8. In a data recording machine of the character described, a keyboard, a magnetic core memory, said memory including a left zero field identified by a particular program code in its most significant digit position, the memory location following the least significant digit position of the left zero field also being identified by a most significant digit code, means to transfer data that is keyed into the machine for left zeroing from said keyboard to memory beginning at the most significant digit position of the left zero field, said keyboard including a left zero key adapted to be depressed after keying in the least significant digit of the data to initiate a left zero operation, means actuated by the depression of the left zero key to determine if such depression is occurring at a memory position containing a most significant digit code, means operable when the left zero key is not depressed in a most significant digit code position to successively fill the unused positions of the left zero field with blanks, means operable upon encountering the most significant digit position of the next data field to backspace through the left zero field without changing the contents thereof, means operable upon encountering the most significant digit position of the left zero field to place a decimal zero therein and thereafter shift the contents of the field to the right by one memory position, means operable after said right shift operation to compare the contents of the least significant digit position of the left zero field with the contents of the previous memory location, and means operable when said contents are not the same to terminate the left zero operation.

9. A machine as defined in claim 8 including a memory advance flip-flop, a first and a second left zero flip-flop and a function flip-flop all of which are caused to set by depression of said left zero key, said first left zero flip-flop when set being operable to cause the unused positions of the left zero field to be filled with blanks, said second left zero flip-flop when set being operable to cause said memory advance flip-flop to be jammed in the set state, and said function flip-flop when set being operable to provide one dummy memory cycle for determining whether or not depression of the left zero key occurred in a most significant digit position.

10. A machine as defined in claim 8 including a memory backspace flip-flop, said flip-flop being set whenever a most significant digit position is encountered when accessing successive memory locations in a forward pass through the machine, the setting of said flop-flop causing the memory positions of the left zero field to be accessed in reverse order, said flip-flop being reset when the most significant position of the left zero field is encountered during said reverse pass through the machine.

11. A machine as defined in claim 9 including an equal flip-flop that is set when the contents of the accessed memory location are the same as the contents of the previous memory location and is reset when the contents of said locations are not equal, said left zero operation being terminated when said equal flip-flop is reset and the next memory location that is accessed following the resetting is the most significant digit position of the next data field.

12. A machine as defined in claim 11 wherein said function flip-flop is reset at the end of said dummy memory cycle, said flip-flop being set again when the equal flip-flop resets and the next memory position that is accessed is the most significant digit position of the next data field, said function flip-flop in the set condition being operable to block the advance of memory to its next location whereby the contents of said most significant digit position can be interrogated to determine whether the machine is programmed for another automatic operation.

13. In a data storage device having a row of character storage locations and a data word stored therein with its first character in the storage location at one end of said row, means for shifting said word so that its last character is stored in the storage location at the other end of said row, said shifting means comprising:
  space entry means for entering a space character in each location of said row not containing a character of said data word;
  a first character storage register;
  a second character storage register;
  zero entry means for entering the contents of the storage location at said one end of said row into said first register and for thereafter entering a zero into said location;
  shift cycle means operable upon completion of a zero entry cycle for accessing, in a sequence proceeding toward said other end of said row, each remaining storage location of said row, said shift cycle means operating during each said accessing operation to first transfer the contents of said first register into said second register, to then transfer the contents of the accessed location into said first register and to thereafter transfer the contents of said second register into said accessed location; and
  control means responsive to the completion of a space entry cycle for alternately operating first said zero entry means and then said shift cycle means until said last character of said data word is entered into the storage location at said other end of said row.

14. In an apparatus for recording keyboard-generated input characters on magnetic tape, entry means for entering said characters into a buffer memory preparatory to recordation of said characters on said tape, said entry means comprising:
  means for generating an initial signal in response to actuation of a key on said keyboard;
  programming storage means having program control characters stored therein;
  counting means adapted to control accessing of the storage locations of said buffer memory and said programming storage means;
  timing means operable in response to said initial signal for generating a sequence of timing signals;
  means controlled by said timing signals for, first entering the input character generated by said key actuation into accessed storage location in said buffer memory, second, advancing said counting means and, third, sampling the accessed storage location in said programming storage means; and
  means responsive to a predetermined program control character stored in said sampled location for terminating operation of said timing means prior to further advancement of said counting means and for conditioning said timing means to be restarted in response to the next initial signal.

15. The apparatus set forth in claim 14 wherein said programming storage means includes a character storage location corresponding to each storage location of said buffer memory, said counting means being adapted to control accessing of each storage location of said programming storage means in simultaneous relation with accessing of said corresponding storage location.

16. In an apparatus including a keyboard data entry device and transducer means for recording data on a magnetic recording medium, the combination comprising:
  a buffer memory;
  means for storing keyboard-generated data characters in said buffer memory, said means including accessing means for sequentially accessing the storage locations in said buffer memory, generation of each said keyboard data character causing said accessing means to access a different one of said storage locations;
  duplication control means defining at least one duplication field in said buffer memory, said control means being operable, in response to keyboard-controlled accessing of the first storage location of said field, to automatically step said accessing means through the storage locations of said field without altering the data stored therein; and
  means operable upon termination of a keyboard entry cycle to transfer the data stored in said buffer memory to said transducer means for recordation on said magnetic recording medium.

17. In an apparatus for recording keyboard-generated input characters on magnetic tape, entry means for entering said characters into a buffer memory preparatory to recordation of said characters on said tape, said entry means comprising:
  means for generating an initial signal in response to actuation of a key on said keyboard;
  program control means selectively operable to indicate a duplicate operation;
  counting means adapted to control accessing of the storage locations of said buffer memory;
  timing means operable in response to said initial signal for generating a sequence of timing signals;
  logic means controlled by said timing signals for, first, entering the input character generated by said key actuation into the accessed storage location in said buffer memory, second, advancing said counting means and, third, sampling the condition of said program control means; and
  means responsive to said sampling operation, when said program control means is in said duplicate condition, for causing said timing means to operate said logic means to automatically advance said counting means and then resample the condition of said program control means, whereby characters stored in locations of said buffer memory accessed during said automatic operation of said counting means are retained in said memory.

18. The apparatus set forth in claim 17, further comprising:
  means for terminating operation of said timing means when said counting means reaches a predetermined count and for conditioning said timing means to be restarted in response to the next initial signal.

19. In an apparatus including a keyboard data entry device and transducer means for recording data on a magnetic recording medium, the combination comprising:
  a buffer memory;
  means for storing keyboard-generated data characters in said buffer memory, said means including accessing means for sequentially accessing the storage locations in said buffer memory, generation of each said keyboard data character causing said accessing means to access a different one of said storage locations;
  skip control means defining at least one skip field in said buffer memory, said control means being operable, in response to keyboard-controlled accessing of the first storage location of said field, to automatically step said accessing means through the storage locations of said field and to enter a space character in each location so accessed; and means operable upon termination of a keyboard entry cycle to transfer tht data stored in said buffer memory to said transducer means for recordation on said magnetic recording medium.

20. In an apparatus for recording keyboard-generated input characters on magnetic tape, entry means for entering said characters into a buffer memory preparatory to recordation of said characters on said tape, said entry means comprising:

means for generating an initial signal in response to actuation of a key on said keyboard;

program control means selectively operable to indicate a skip operation;

counting means adapted to control accessing of the storage location of said buffer memory;

timing means operable in response to said initial signal for generating a sequence of timing signals;

logic means controlled by said timing signals for, first, entering the input character generated by said key actuation into the accessed storage location in said buffer memory, second, advancing said counting means and, third, sampling the condition of said program control means; and means responsive to said sampling operation, when said program control means is in said skip condition, for causing said timing means to operate said logic means to automatically insert a space character into the accessed storage location in said buffer memory, advance said counting means and then resample the condition said program control means, whereby space characters are stored in all locations of said buffer memory accessed during said automatic operation of said counting means.

21. The apparatus set forth in claim 20, further comprising:

means for terminating operation of said timing means when said counting means reaches a predetermined count and for conditioning said timing means to be restarted in response to the next initial signal.

22. In an apparatus for verifying data recorded on a storage medium, the combination comprising:

a buffer memory;

transfer means for reading a plurality of data characters on said storage medium and for storing duplicate data characters in predetermined character storage locations in said buffer memory;

control means defining at least one automatic verifying field in said buffer memory, said control means being operable to cause each data character stored in a storage location of said field to be compared with the data character previously stored in the same location; and error indication means operable in response to an unequal comparison performed by said last-mentioned means.

23. The apparatus set forth in claim 22 wherein:

said transfer means includes a first character register connected to receive a duplicate of each said data character read on said storage medium, said transfer means further including means for transferring said duplicate character into a predetermined storage location in said buffer memory; and said control means includes a second character register, means for transferring the character stored in said predetermined storage location into said second character register, and means for comparing the characters in said first and second registers prior to transfer of said duplicate character into said predetermined storage location.

24. In an apparatus for recording keyboard-generated data characters on magnetic tape, means for detecting and correcting recording errors comprising:

a buffer memory having storage capacity for at least one keyboard-generated data character;

entry cycle means operable in response to actuation of a key on said keyboard for entering a keyboard-generated character into said buffer memory;

recording cycle means including a recording transducer, operable upon completion of an entry cycle for recording the contents of said buffer memory on said magnetic tape;

checking means for reading from said tape the data recorded during said recording cycle and for comparing the data so read with the contents of said buffer memory; and control means responsive to an unequal comparison performed by said last-mentioned means for conditioning said recording cycle means to rerecord the contents of said buffer memory on a different section of said tape.

25. The apparatus set forth in claim 24, wherein said control means further comprises:

means for automatically operating said checking means upon completion of said rerecording operation by said recording cycle means.

26. The apparatus set forth in claim 24 wherein:

said entry cycle means includes means operable to enter a predetermined number of keyboard-generated characters into said buffer memory during an entry cycle; and said checking means includes means for backspacing said tape prior to the reading of the data thereon, whereby said transducer is positioned to be utilized for reading said data.

27. In an apparatus including a keyboard data entry device and means for magnetically recording data, the combination comprising:

timing means operable to control said magnetic recording means to sequentially record groups of data characters, each said group having a predetermined number of characters;

first input means automatically supplying characters identical to the characters recorded in a previous group of characters;

second input means supplying a predetermined, fixed character; and program control means selectively operable to supply said magnetic recording means with characters from either said first input means or said second input means in accordance with a predetermined program code.

28. In an apparatus for recording data characters on a magnetic tape, the combination comprising:

a buffer storage register;

a keyboard for manually generating signals representative of data characters;

first data transfer means for transferring keyboard-generated character signals to said buffer storage register for storage therein;

duplication means for supplying signals representative of data characters previously recorded on said tape;

program control means;

second data transfer means controlled by said program control means for transferring signals from said duplication means to said buffer storage register for storage therein;

transducer means for recording data characters on said tape; and third data transfer means for transferring data signals stored in said buffer register to said transducer means for recordation on said tape.

29. Data recording apparatus comprising, in combination:

keyboard input means for suplying selected data characters when activated;

alternate input means for supplying pre-selected data characters when activated;

program control means for selectively activating either the keyboard means or the alternate input means in accordance with a predetermined program;

and means for storing the data characters selected by the program control means on a magnetic surface in groups of data characters, each group containing a predetermined number of character positions.

30. The apparatus described in claim 29, wherein the predetermined program is identical for a plurality of sequential groups of data characters, whereby corresponding character positions in each of the plurality of groups of data characters are derived from the same input means.

31. The apparatus described in claim 29, wherein at least some of the pre-selected data characters supplied by the alternate input means are duplicates of data characters supplied in previous groups of data characters in the same data positions by the keyboard input means.

32. The apparatus described in claim 30, wherein at least some of the pre-selected data characters supplied by the alternate input means are duplicates of data characters supplied in previous groups of data characters in the same data positions by the keyboard input means.

33. The apparatus described in claim 29, wherein at least some of the pre-selected data characters supplied by the alternate input means are predetermined skip characters.

34. The apparatus described in claim 30, wherein at least some of the pre-selected data characters supplied by the alternate input means are predetermined skip characters.

35. The apparatus described in claim 24, wherein at least some of the preselected data characters supplied by the alternate input means are duplicates of data characters previously supplied in previous groups of data characters in the same data positions by the keyboard input means, wherein at least some others of the preselected data characters supplied by the alternate input means are predetermined skip characters; and wherein the program control means further selects the duplicate characters and the skip characters in accordance with a predetermined program.

References Cited

UNITED STATES PATENTS

| | | | |
|---|---|---|---|
| 3,037,193 | 5/1962 | Barbagallo et al. | 340—172.5 |
| 3,085,229 | 4/1963 | Blumenthal | 340—172.5 |
| 3,293,613 | 12/1966 | Gabor | 340—172.5 |
| 2,688,656 | 9/1954 | Wright et al. | 340—172.5 |
| 2,827,623 | 3/1958 | Ainsworth | 340—172.5 |
| 3,149,309 | 9/1964 | Schmidt | 340—172.5 |
| 3,183,484 | 5/1965 | Christiansen et al. | 340—146.2 |
| 3,197,742 | 7/1965 | Rettig et al. | 340—172.5 |
| 3,238,360 | 3/1966 | Wright et al. | 340—172.5 |
| 3,310,787 | 3/1967 | Welsh et al. | 340—172.5 |
| 3,365,702 | 1/1968 | Heatwole | 340—172.5 |

RAULFE B. ZACHE, Primary Examiner